(12) United States Patent
Kobayashi et al.

(10) Patent No.: US 9,359,508 B2
(45) Date of Patent: Jun. 7, 2016

(54) WATER-BASED SLURRY COMPOSITION, ELECTRODE PLATE FOR ELECTRICITY STORAGE DEVICE, AND ELECTRICITY STORAGE DEVICE

(75) Inventors: Nobuyuki Kobayashi, Tokyo (JP); Takanori Sannan, Tokyo (JP); Shinya Tsuchida, Tokyo (JP); Yoshihiko Iijima, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 1142 days.

(21) Appl. No.: 13/392,034

(22) PCT Filed: Aug. 24, 2010

(86) PCT No.: PCT/JP2010/064262
§ 371 (c)(1),
(2), (4) Date: Feb. 23, 2012

(87) PCT Pub. No.: WO2011/024797
PCT Pub. Date: Mar. 3, 2011

(65) Prior Publication Data
US 2012/0156562 A1    Jun. 21, 2012

(30) Foreign Application Priority Data
Aug. 27, 2009  (JP) ................................. 2009-197036

(51) Int. Cl.
| | | |
|---|---|---|
| H01M 4/13 | (2010.01) |
| C09D 5/24 | (2006.01) |
| H01G 11/38 | (2013.01) |
| H01M 4/04 | (2006.01) |
| H01M 4/139 | (2010.01) |
| H01M 4/62 | (2006.01) |
| H01M 4/66 | (2006.01) |
| C09D 101/28 | (2006.01) |
| C09D 103/08 | (2006.01) |
| C09D 105/04 | (2006.01) |
| C09D 105/08 | (2006.01) |
| C08L 1/28 | (2006.01) |
| C08L 3/08 | (2006.01) |
| C08L 5/04 | (2006.01) |
| C08L 5/08 | (2006.01) |
| H01G 11/26 | (2013.01) |
| H01G 11/28 | (2013.01) |
| H01M 4/583 | (2010.01) |
| H01M 10/0525 | (2010.01) |

(52) U.S. Cl.
CPC . *C09D 5/24* (2013.01); *C08L 1/284* (2013.01); *C08L 1/286* (2013.01); *C08L 3/08* (2013.01); *C08L 5/04* (2013.01); *C08L 5/08* (2013.01); *C09D 101/284* (2013.01); *C09D 101/286* (2013.01); *C09D 103/08* (2013.01); *C09D 105/04* (2013.01); *C09D 105/08* (2013.01); *H01G 11/26* (2013.01); *H01G 11/28* (2013.01); *H01G 11/38* (2013.01); *H01M 4/0404* (2013.01); *H01M 4/13* (2013.01); *H01M 4/139* (2013.01); *H01M 4/622* (2013.01); *H01M 4/667* (2013.01); *H01M 4/583* (2013.01); *H01M 4/625* (2013.01); *H01M 10/0525* (2013.01); *Y02E 60/122* (2013.01); *Y02E 60/13* (2013.01); *Y02P 70/54* (2015.11); *Y10T 428/2913* (2015.01); *Y10T 428/31678* (2015.04); *Y10T 428/31971* (2015.04); *Y10T 428/31975* (2015.04); *Y10T 442/20* (2015.04)

(58) Field of Classification Search
None
See application file for complete search history.

(56) References Cited

U.S. PATENT DOCUMENTS

| | | | |
|---|---|---|---|
| 5,521,292 A | 5/1996 | Ueda et al. | |
| 2002/0132167 A1 * | 9/2002 | Gan et al. | ...................... 429/241 |
| 2002/0160247 A1 | 10/2002 | Tzeng et al. | |
| 2003/0027046 A1 | 2/2003 | Hosokawa et al. | |
| 2004/0092620 A1 | 5/2004 | Kobayashi et al. | |
| 2004/0130038 A1 | 7/2004 | Murakami et al. | |
| 2005/0225929 A1 | 10/2005 | Murakami et al. | |
| 2006/0222952 A1 | 10/2006 | Kono | |
| 2007/0109722 A1 | 5/2007 | Ohmori | |
| 2008/0160405 A1 | 7/2008 | Yang et al. | |
| 2009/0029255 A1 * | 1/2009 | Ohmori | ...................... 429/231.1 |
| 2009/0257171 A1 | 10/2009 | Yamazaki et al. | |

(Continued)

FOREIGN PATENT DOCUMENTS

| | | |
|---|---|---|
| CN | 101116201 | 1/2008 |
| CN | 101806766 | 8/2010 |

(Continued)

OTHER PUBLICATIONS

Fujiyama: "New Mixing and Dispersion Technology for Conductive Fillers and Measures for Mixing and Dispersion Failures"; Technical Information Institute Co., Ltd. p. 20 (2004); English Abstract.

(Continued)

*Primary Examiner* — Alix Eggerding
(74) *Attorney, Agent, or Firm* — Hamre, Schumann, Mueller & Larson, P.C.

(57) ABSTRACT

A water-based slurry composition contains (1) a water-based medium containing at least water as a polar solvent, (2) at least one polymer selected from cellulose derivatives, alginic acid derivatives, starch derivatives, chitin derivatives, chitosan derivatives, polyallylamine and polyvinylamine, (3) a hydrophobic filler, and (4) a polybasic acid or a derivative thereof. The composition has a water content of 30 mass % or higher. An electrode plate for an electricity storage device, and the electricity storage device are also disclosed.

20 Claims, No Drawings

(56) References Cited

U.S. PATENT DOCUMENTS

| | | | |
|---|---|---|---|
| 2009/0284900 A1* | 11/2009 | Fukumine | 361/502 |
| 2009/0317718 A1 | 12/2009 | Imachi et al. | |
| 2010/0291306 A1* | 11/2010 | Tsuchida | C08B 37/003 427/384 |
| 2011/0043966 A1 | 2/2011 | Kobayashi | |
| 2011/0091771 A1 | 4/2011 | Sannan et al. | |
| 2011/0133763 A1 | 6/2011 | Schulte et al. | |
| 2011/0305970 A1 | 12/2011 | Sahai et al. | |
| 2012/0148917 A1 | 6/2012 | Kobayashi et al. | |
| 2012/0156563 A1 | 6/2012 | Kobayashi et al. | |
| 2012/0160128 A1 | 6/2012 | Kobayashi et al. | |

FOREIGN PATENT DOCUMENTS

| | | | |
|---|---|---|---|
| EP | 1978056 | | 10/2008 |
| EP | 2048726 | | 4/2009 |
| EP | 2284235 | | 2/2011 |
| JP | 63-10456 | | 1/1988 |
| JP | 3-285262 | | 12/1991 |
| JP | 5-194912 | | 8/1993 |
| JP | 9-227633 | | 9/1997 |
| JP | 11-297332 | | 10/1999 |
| JP | 11-323175 | | 11/1999 |
| JP | 2001-6436 | | 1/2001 |
| JP | 2002-42817 | | 2/2002 |
| JP | 2002-105241 | | 4/2002 |
| JP | 2003-206409 | | 7/2003 |
| JP | 2003-272619 | | 9/2003 |
| JP | 2004-210980 | | 7/2004 |
| JP | 2005-129437 | | 5/2005 |
| JP | 2006-040595 | | 2/2006 |
| JP | 2006-134777 | | 5/2006 |
| JP | 2006-286344 | | 10/2006 |
| JP | 2006-310010 | | 11/2006 |
| JP | 2007-095641 | | 4/2007 |
| JP | 2007-224263 | | 9/2007 |
| JP | 2008-60060 | | 3/2008 |
| JP | 2008-184485 | | 8/2008 |
| JP | 2009-26744 | | 2/2009 |
| JP | 2009-64564 | | 3/2009 |
| JP | 2009-148681 | | 7/2009 |
| JP | 2009-170287 | | 7/2009 |
| JP | 2009-238720 | | 10/2009 |
| JP | 2009-277783 | | 11/2009 |
| JP | 2011-528794 | | 11/2011 |
| TW | 200828658 | | 7/2008 |
| TW | 200923032 | | 6/2009 |
| WO | WO 2006/085691 | * | 8/2006 |
| WO | WO 2006/106680 | * | 10/2006 |
| WO | WO2007/086211 | | 8/2007 |
| WO | WO2008/015828 | | 2/2008 |
| WO | WO 2008/123143 | | 10/2008 |
| WO | WO 2009/147989 | | 12/2009 |

OTHER PUBLICATIONS

Tachibana: "Preparation, Coating and Drying of Positive Electrode Slurry for Lithium Ion Secondary Cells, and Understanding of Electrode Operations" Technical Information Institute Co., Ltd., 8(12), pp. 72-75 (2009); English Abstract.

Joe: "Technological Development of Dispersing Agents for Water Borne Coating Materials" JETI, 44(10), pp. 110-112 (1996); English Abstract.

Kamiya: "Characterization and control of aggregation and dispersion behavior of fine powder in aqueous suspension" 2(1), pp. 54-60; English Abstract.

Abe et al.: "Charge Transfer Reactions in Li-Ion Batteries" Journal of the Surface Science Society of Japan, 27(10), 609-612 (2006); English Abstract.

Akatsuka, Yasumasa: "Development Trends of Environment-responsive Epoxy Resins", JETI, 50(9), 103-105 (2002); English Abstract.

Hashimoto et al.: "Electrolyte Thin Film Formation for Solid Oxide Fuel Cells Using Water-based Slurry Contained $Ce_{0.9}Gd_{0.1}O_{1.95}$ Nano-powder", ElectroChemistry, 77(2), 195-198 (2009); English Abstract.

Masamune, Kiyoshi: "Environmentally-friendly, Water-based Epoxy Resins", JETI, 50(9), 121-124 (2002); English Abstract.

Nishina et al.: "Effects of Passivation Film at Aluminum Current Collector of Lithium Ion Secondary Batteries on Charging/Discharging Performance", Battery Technology, 15, 28-40 (2003); English Abstract.

Sakamoto et al.: "Processing of Dielectric Ceramic Sheets Using Aqueous Slurries", Materials Integration, 19(5), 25-33 (2006); English Abstract.

Takada, Kazunori: "Improvement of high-rate capability of solid-state lithium-ion battery", Technical Research Report, The Institute of Electronics, Information and Communication Engineers, 107(493), 43-47 (2008); English Abstract.

Yoshitake et al.: SEI Films Obtained by the Addition of Functional Additives to Li-Ion Batteries, Journal of the Surface Finishing Society of Japan, 53(12), 887-889 (2002); English Abstract.

* cited by examiner

WATER-BASED SLURRY COMPOSITION, ELECTRODE PLATE FOR ELECTRICITY STORAGE DEVICE, AND ELECTRICITY STORAGE DEVICE

TECHNICAL FIELD

This invention relates to a water-based slurry composition, which contains a polysaccharide-based polymer of low environmental load and a water-based medium containing water and also contains a uniformly-dispersed hydrophobic filler. The present invention also relates to an application technology for the water-based slurry composition, that is, a technology which in an electricity storage device such as a secondary cell or capacitor, is effective for enhancing the adhesion between a collector and an electrode active material layer (hereinafter called "the electrode layer"), decreasing the internal resistance, and also improving the cycle characteristics by arranging a coating film of excellent solvent resistance between the collector and the electrode layer and which makes it possible to provide an electrode plate for an electricity storage device and the electricity storage device including the electrode plate. The water-based slurry composition according to the present invention is not limited to the above-described applications, but can be applied to various coating formulations useful in a variety of industrial fields and can have a wide range of utility.

BACKGROUND ART

In recent years, attempts have been made in various fields to use the functionality of coating films formed by preparing slurries, pastes or the like, which contain functional materials and will hereinafter be referred to as "slurries", into coating formulations and applying the coating formulations.

For example, a paste-form, conductive coating formulation composed of a conductive filler, binder resin, curing agent, solvent and the like is used as a conductive adhesive, conductive paint, conductive ink or the like depending on its application (Non-patent Document 1). A coated, magnetic recording medium such as an audio tape, video tape, floppy disk or the like is manufactured by applying, onto a base film of a polyester or the like, a magnetic-coating formulation with magnetic particles of submicron size uniformly dispersed in a polymer solution. Further, each electrode structure of a lithium ion secondary cell is realized by mixing a binder with an active material and conductive aid to prepare a slurry, coating the slurry onto a collector foil, and then drying it (Non-patent Document 2).

As common attributes that allow each of the above-described coating formulations to fully exhibit its functionality, the dispersoid is uniformly dispersed in the dispersion medium, and moreover, the coating film to be formed can realize high adhesiveness. In other words, for allowing a functional filler to fully exhibit its functionality by using a slurry with the functional filler contained therein, it is essential conditions that the state of the slurry is appropriate for the exhibition of the functionality, specifically that the filler is uniformly and stably dispersed and can form a coating film of high adhesiveness. Choosing adequate solvents with a focus being centered around the dispersibility of a filler with a view to meeting such conditions, nonaqueous (organic-solvent-based) solvents (dispersion media), which are excellent in the uniform dispersibility of the filler, show high adhesive force and can be readily dried, are overwhelmingly advantageous as solvents (dispersion media) for slurries, and as a matter of fact, have been widely used.

However, organic solvents are not only volatile and high in environmental load but are also required to take genotoxicity into consideration, and therefore, still involve problems in safety and workability. In recent years, there is an increasing concern about the protection of environment and the prevention of health hazards in many industrial fields, leading to increasing demands toward VOC reductions, solventless coating and the like in connection with the use of organic solvents involving such problems as described above. It is, accordingly, required to switch to products that are friendly to the environment and people.

Now, those which are attracting the greatest attention as products friendly to the environment and people are water-based products or products made from raw materials of biological origin, which are expected to become part of solventless or post-petroleum products. Various problems, however, arise if water is used as a solvent in place of an organic solvent in a slurry that contains a hydrophobic filler. In a water-based slurry, for example, filler particles tend to agglomerate in the slurry when they are in a charged state, and moreover, they are prone to settling due to a large difference in specific gravity between the solvent and the solute, thereby raising a problem in that their uniform dispersion is very difficult. In addition, it is not easy to find raw materials of biological origin, which are excellent in functionality and can replace conventional raw materials of petroleum origin.

As general measures to cope with dispersion failures, addition of a dispersant, surface treatment, microencapsulation or ultrasonic treatment of a filler, introduction of polar groups into a polymer, and the like can be contemplated. In fact, examples of the addition of a dispersant include the attempt to use a water-soluble, amphoteric dispersant for a slurry composition that contains a microparticulated black inorganic oxide useful in paints, inks, rubbers and plastics, electronic materials and the like. (Patent Document 1) and the attempt to use a compound having one or more basic functional groups in an composition for cells, which contains a conductive aid (Patent Document 2). Further, examples of the surface treatment of a filler include various proposals such as the attempt to form surface treatment layers by reacting the metal oxide on surfaces of a microparticulate metal-oxide filler with a hydrophilic silane coupling agent (Patent Document 3). In addition, proposals have been made including the application of ultrasonic vibrations to a paste, which contains an inorganic oxide filler, to disperse the filler and the formation of an insulating resin on surfaces of a conductive filler to provide microencapsulated conductive filler.

However, the dispersion media used in these proposals are primarily organic solvents, and water-based media are used only in a very small number of cases. In contrast to these proposals, it is strongly desired, from an increasing concern about the protection of environment and the prevention of health hazards in recent years, to develop a method that uses a water-based slurry, which is friendly to the environment, is low cost and is high in safety, and that can uniformly disperse a filler.

Upon attempting the dispersion and stabilization of a filler in a water-based slurry, the use of the above-described, respective methods may be contemplated. Among them, the use of a dispersant is advantageous when the simplification of the production process and coating system and the cost matter are taken into account. As a dispersant for use in a water-based slurry, it is possible to mention a polycarboxylate salt or phosphate amine salt used in the field of paints (Non-patent Document 3), a polyacrylamide as a high-molecular dispersant (Non-patent Document 4), or the like. When a reduction in environmental load is taken into consideration, however, preferred is a substance of natural origin that is friendly to the environment. In this regard, a proposal has been made about the use of carboxymethylcellulose as a water-based dispersant upon production of each electrode for a nonaqueous secondary cell (Patent Document 4). According to a study by the present inventors, however, there is still a room for an improvement in its dispersing effect. On the other hand, the use of a petroleum-based binder resin is needed to form a strong coating film. There is, accordingly, an outstanding desire for an application technology of a natural polymer which, although it is a substance of natural origin, makes it possible to realize adhesiveness which is by no means inferior to that available when a petroleum-based binder resin is used.

As a measure to cope with a dispersion failure of a hydrophobic filler in a water-based medium, a contrivance is also considered to be needed for a dispersion medium that is considered possible to provide a relatively simple and economical solution without time-consuming processing treatment for a filler in a slurry composition, addition of a costly dispersant to the composition, or a similar need. However, there are only few cases in which an attempt was made to improve a dispersion medium with respect to a water-based slurry composition containing a hydrophobic filler. Upon using a water-based slurry composition as a coating formulation, the coating formulation can be produced with a simpler composition and at low cost without specifically adding a dispersant if a binder in the slurry composition is provided with both a binding effect for a hydrophobic filler and a dispersing effect for the filler. However, such cases are not many either.

From such circumstances as described above, there is an outstanding keen desire for the development of a water-based slurry composition, which contains a natural polymer having both a binding effect and a dispersing effect, makes use of an improved dispersion medium, is friendly to the environment, is low cost, is high in safety, and has high versatility.

As an expected application for the above-described water-based slurry composition, a coating formulation for electrode plates in electricity storage devices such as secondary cells or capacitors is considered. The demand for these electricity storage devices has been significantly growing in recent years. Each electrode plate gives considerable effects on the performance of an electricity storage device, and is an electrode member with unit members such as an electrode layer and collector integrated therein. Concerning such an electrode plate, proposals have been made to permit its production in the form of a thinner film with larger area such that it can be provided with an extended charge-discharge cycle life and an increased energy density. As to lithium ion cells, for example, Patent Document 5, Patent Document 6, etc. disclose positive electrode plates each of which is obtained by dispersing or dissolving a conductive material and binder along with powder of a positive-electrode active material such as a metal oxide, sulfide or halogenide in an appropriate solvent to prepare a paste-form coating formulation, providing as a substrate a collector formed of a foil of a metal such as aluminum, and applying the coating formulation onto a surface of the substrate to form a coating film layer.

A capacitor, which makes use of an electric double layer formed at an interface between a polarizable electrode plate and an electrolyte, is used as a memory backup power supply, and its use in fields that require large outputs like a power source for an electric car is also attracting interests. For large outputs, this capacitor is hence required to have both a high capacitance and a low internal resistance. Like a negative electrode plate for the above-described cell, the electrode plate for the capacitor is produced by applying onto a collector a coating formulation, which is generally formed of a water-based slurry composition with a binder, conductive material and the like mixed therein, and then drying the coating formulation.

As a resin binder for use in the above-described coating formulation for the electrode plates in the above-described electricity storage device such as the lithium ion cell or capacitor, a fluorinated resin such as polyfluorinated vinylidene or a silicone-acrylic copolymer is used, for example. A negative electrode plate (cell) or polarizable electrode plate (capacitor) is obtained by adding a solution of a binder in a suitable solvent to an active material such as a carbonaceous material to prepare a paste-form coating formulation and then applying the coating formulation onto a collector. In the above-described coated electrode plate, the binder employed to prepare the coating formulation is required to be electrochemically stable to a nonaqueous electrolyte and to be free from dissolution into the electrolyte of the cell or capacitor, to remain free from substantial swelling by the electrolyte, and further to be soluble in a certain solvent to permit the coating.

On the other hand, it is practiced to form a protective film on a surface of a metal material such as aluminum, as a base metal material of a collector, by coating a solution of one of various resins. The resulting film is excellent in the adhesiveness to the metal surface, but is accompanied by a problem in that its durability to an organic solvent is insufficient.

In the electrode plate for the cell or capacitor, said electrode plate having been obtained by applying the above-described coating formulation onto the surface of an aluminum foil, copper foil or the like as the collector, the coating film layer formed by the coating and drying is accompanied by problems in that its adhesiveness to the collector and its flexibility are insufficient, its contact resistance to the collector is high, and peeling, flaking, cracking and/or the like of the coating film layer takes place during assembly steps of the cell or capacitor or upon charging and discharging the same.

As described above, the conventional cell or capacitor is accompanied by the problems of the poor adhesion between the electrode layer and the collector (substrate) and the high internal resistance at the interface between the electrode layer and the substrate. A variety of coating formulations have been proposed to solve these problems. Coating film layers formed from these coating formulations lessen the adhesiveness problem, but make still higher the resistances between the electrode layers and the collectors. Therefore, none of these coating formulations have led to a solution to the problems yet. In recent years, there is also an increasing demand for the manufacture of the above-described electricity storage devices such as lithium ion cells and electric double-layer capacitors and their related products with due consideration being paid to the environment. As described above, there is hence a demand for a coating formulation, which uses components, materials and a preparation method that do not add much load on the environment.

PRIOR ART DOCUMENTS

Patent Documents

Patent Document 1: JP-A-2009-148681
Patent Document 2: JP-A-2009-26744
Patent Document 3: JP-A-2008-184485
Patent Document 4: JP-A-2009-238720
Patent Document 5: JP-A-63-10456
Patent Document 6: JP-A-3-285262

Non-Patent Documents

Non-patent Document 1: FUJIYAMA, Mitsuyoshi: "Chapter I, Causes of Mixing and Dispersion Failures for Conductive Fillers", "New Mixing and Dispersion Technology for Conductive Fillers and Measures for Mixing and Dispersion Failures" in *Japanese*, Technical Information Institute Co., Ltd. p. 20 (2004)

Non-patent Document 2: TACHIBANA, Hirokazu: "Preparation, Coating and Drying of Positive Electrode Slurry for Lithium Ion Secondary Cells, and Understanding of Electrode Operations" in *Japanese*, Material Stage, Technical Information Institute Co., Ltd., 8(12), pp. 72-75 (2009)

Non-patent Document 3: JOE, Kiyokazu: "Technological Development of Dispersing Agents for Water Borne Coating Materials" in *Japanese*, JETI, 44(10), pp. 110-112 (1996)

Non-patent Document 4: KAMIYA, Hirohide: "Characterization and control of aggregation and dispersion behavior of fine powder in aqueous suspension" in *Japanese*, Material Stage, 2(1), pp. 54-60 (2002)

DISCLOSURE OF THE INVENTION

Problem to be Solved by the Invention

Therefore, an object of the present invention is to provide a useful, water-based slurry composition, which can solve the above-described problems and can exhibit a binding function and dispersion function at the same time for a hydrophobic filler despite the use of a material, which is low in environmental load, as a principal component. Another object of the present invention is to provide an economical water-based slurry composition, which despite the inclusion of water in a dispersion medium, remains at an adequate viscosity, is resistant to the occurrence of settling-out of a hydrophobic filler and retains a high degree of dispersion even when stored over a long period of time, and is economical. The provision of such a water-based slurry composition makes it possible to form a coating film of excellent adhesiveness with the hydrophobic filler being uniformly dispersed therein. The water-based slurry composition is hence expected to find utility not only in cells but also in many fields such as electronic materials, paints, inks, toners, rubbers and plastics, ceramics, magnetic materials, adhesives, and liquid-crystal color filters. In other words, a further object of the present invention is to provide a technology that can contribute to the protection of environment and the prevention of health hazards, both of which have become objects of public concern, and can be used in many industrial fields. A still further object of the present invention is to provide a water-based slurry composition of a hydrophobic filler, which can be used as a coating formulation that enables the formation of a coating film equipped with excellent adhesiveness and electrolyte resistance and also with improved contact resistance to a collector formed of an aluminum foil or copper foil, specifically at an interface between the collector and an electrode layer. If a water-based slurry composition capable of forming such a coating film layer is provided, it will be extremely useful for electrode plates for electricity storage devices, which are expected to find widespread utility from now on, and also for the electricity storage devices including the electrode plates.

Means for Solving the Problem

The above-described objects can be achieved by the present invention to be described below. Described specifically, the present invention provides a water-based slurry composition comprising (1) a water-based medium containing at least water as a polar solvent, (2) at least one polymer selected from cellulose derivatives, alginic acid derivatives, starch derivatives, chitin derivatives, chitosan derivatives, polyallylamine and polyvinylamine, (3) a hydrophobic filler, and (4) a polybasic acid or a derivative thereof, wherein a content of water in the composition is 30 mass % or higher.

As preferred embodiments of the water-based slurry composition according to the present invention, the water-based slurry compositions to be described hereinafter can be mentioned. The polymer may comprise at least one polymer selected from the group consisting of hydroxyethylcellulose, hydroxypropylcellulose, carboxymethylcellulose, cationized celluloses, hydroxyethyl starch, propylene glycol alginate, carboxymethyl chitin, polyallylamine, polyvinylamine, glycerylated chitosan, hydroxyethyl chitosan, hydroxypropyl chitosan, hydroxybutyl chitosan, and hydroxybutyl hydroxypropyl chitosan. The polybasic acid or the derivative thereof may be at least one polybasic acid or at least one derivative thereof selected from the group consisting of 1,2,3,4-butanetetracarboxylic acid, pyromellitic acid, pyromellitic acid anhydride, trimellitic acid, trimellitic acid anhydride, adipic acid, citric acid, tartaric acid, 1,2,4-cyclohexanetricarboxylic acid, 1,2,3-propanetricarboxylic acid, 1,2,4,5-cyclohexanetetracarboxylic acid, 1,4,5,8-naphthalenetetracarboxylic acid, and 1,2,3,4,5,6-cyclohexanehexacarboxylic acid.

The water-based slurry composition may have a viscosity at 25° C. of from 100 to 20,000 mPa·s when measured at a rotational speed of 30 rpm by a Brookfield rotational viscometer, and a pH of 6 or lower when measured at 25° C. after the slurry composition has been diluted with distilled water of the same weight. The water-based medium may contain an organic solvent, and the organic solvent may have solubility in water and may be at least any one solvent selected from the group consisting of isopropyl alcohol, methyl alcohol, ethyl alcohol, t-butyl alcohol and N-methyl-2-pyrrolidone. The hydrophobic filler may be a conductive carbon filler and/or silica. The hydrophobic filler may be a conductive carbon filler, and may be for the formation of a coating film of an electrode plate for an electricity storage device.

In another aspect of the present invention, there is also provided an electrode plate for an electricity storage device, comprising a coating film arranged by applying the above-described water-based slurry composition between a collector and an electrode layer.

As preferred embodiments of the electrode plate according to the present invention for the electricity storage device, the coating film may have a thickness of from 0.1 to 2 μm. The coating film may have a surface resistivity of 3,000 WO or lower. The coating film may have been formed by heat treatment at from 100 to 250° C. The collector may be an aluminum foil, and the electrode layer may comprise a positive-electrode active material. The collector may be a copper foil, and the electrode layer may comprise a negative-electrode active material. The collector may be an aluminum foil, and the electrode layer may be a polarizable electrode.

In a further aspect of the present invention, there is also provided an electricity storage device comprising the above-descried electrode plate. The electricity storage device may include a secondary cell or a capacitor such as an electric double-layer capacitor or lithium ion capacitor.

Advantageous Effects of the Invention

According to the present invention, a useful, water-based slurry composition is provided. This water-based slurry composition can exhibit a binding function and dispersion function at the same time for a hydrophobic filler despite the use of a polysaccharide-based polymer or the like, which is low in environmental load, as a principal component. According to the present invention, another water-based slurry composition is also provided. Despite the inclusion of water in a dispersion medium, this water-based slurry composition remains at an adequate viscosity, is resistant to the occurrence of settling-out of a hydrophobic filler and retains a high degree of dispersion even when stored over a long period of time, and is economical. These water-based slurry compositions provided by the present invention makes it possible to form coating films of excellent adhesiveness with the hydrophobic filler being uniformly dispersed therein, and are hence expected to find utility not only in cells but also in many fields such as electronic materials, paints, inks, toners, rubbers and plastics, ceramics, magnetic materials, adhesives, and liquid-crystal color filters, thereby providing a useful technology that can contribute to the protection of environment and the prevention of health hazards in many industrial fields. According to the present invention, a water-based slurry composition of a hydrophobic filler is also provided. This water-based slurry composition can be used as a coating formulation that enables the formation of a coating film equipped with excellent adhesiveness, solvent resistance and electrolyte resistance and also with improved contact resistance to a collector formed of an aluminum foil or copper foil, specifically at an interface between the collector and an electrode layer, so that the water-based slurry composition can be applied to electrode plates for electricity storage devices expected to find widespread utility, such as electrode plates for cells and polarizable electrode plates for capacitors, and also to the electricity storage devices including the electrode plates, and is extremely useful. According to the present invention, there is provided a technology that can contribute to the protection of environment and the prevention of health hazards, both of which have become objects of public concern, and can be used in many industrial fields.

MODES FOR CARRYING OUT THE INVENTION

The present invention will next be described in further detail based on best modes for carrying out the invention. As a result of enthusiastic research conducted to achieve the above-described objects, the present inventors found that the incorporation of a specific polysaccharide-based polymer or the like and a polybasic acid or its derivative in a water-based medium containing water makes it possible to reduce the settling-out of a hydrophobic filler and to solve the above-described problems of the conventional art, leading the completion of the present invention. Described specifically, owing to the incorporation of the polysaccharide-based polymer or the like equipped with both a binding function and dispersing function for the hydrophobic filler, the water-based slurry which the present invention provides can exhibit improved environmental performance while retaining functionality such as binding property and dispersing property to the filler. In addition, the use of water at a content in the specific range, and more preferably, the use of a mixed medium of water and an organic solvent having solubility in water, such as an alcohol or the like, as a dispersion medium can provide the slurry with an adequate viscosity while effectively inhibiting precipitation of the polysaccharide-based polymer or the like, so that the settling-out of the hydrophobic filler in the water-based medium can be reduced to materialize still higher dispersion properties and dispersion stability.

The term "water-based slurry composition" as used herein means a composition in such a form that a raw material powder such as a hydrophobic filler powder is dispersed at a high concentration in a water-based medium or a composition in such a muddy form that solid particles such as very fine particles of a hydrophobic filler are mixed in the water-based medium.

The water-based slurry composition according to the present invention contains at least one polymer (which may hereinafter be called "the polysaccharide-based polymer or the like") selected from polysaccharide-based polymers such as cellulose derivatives, alginic acid derivatives, starch derivatives, chitin derivatives and chitosan derivatives, polyallylamine and polyvinylamine. Polysaccharides such as chitosan, chitin, cellulose, starch and alginic acid, which are polysaccharide-based polymers, are available from the market and can be used as they are. From the standpoint of solubility in water and an organic solvent which may be added as needed, derivatives of such polysaccharides are preferred.

Preferably-usable polysaccharide-based polymers include chitosan, and chitosan derivatives such as glycerylated chitosan, hydroxyethyl chitosan, hydroxypropyl chitosan, hydroxybutyl chitosan, hydroxybutyl hydroxypropyl chitosan, carboxymethyl chitosan and succinyl chitosan; chitin, and chitin derivatives such as carboxymethyl chitin; cellulose, and cellulose derivatives such as methylcellulose, ethylcellulose, butylcellulose, carboxymethylcellulose, hydroxymethylcellulose, hydroxyethylcellulose, hydroxypropylcellulose, cellulose acetate, alkali cellulose, viscose, cellulose sulfate, fatty acid cellulose esters and cationized celluloses; starch, and starch derivatives such as hydroxyethyl starch, hydroxypropyl starch, carboxymethyl starch and cationized starches; alginic acid, and alginic acid derivatives such as propylene glycol alginate; and polysaccharides of plant origin, such as soybean polysaccharide.

Among these, it is particularly preferred to use at least one polymer selected from the group consisting of hydroxyethylcellulose, hydroxypropylcellulose, carboxymethylcellulose, cationized celluloses, hydroxyethyl starch, propylene glycol alginate, carboxymethyl chitin, polyallylamine, polyvinylamine, glycerylated chitosan, hydroxyethyl chitosan, hydroxypropyl chitosan, hydroxybutyl chitosan, and hydroxybutyl hydroxypropyl chitosan.

In the water-based slurry composition according to the present invention, water is contained as much as 30 mass % or more. More preferably, however, the water may be in the form of a mixed medium with an organic solvent contained in the water-based slurry composition and having solubility in water. The content of the organic solvent in the mixed solvent may be optional within a range of lower than 70 mass; although it varies depending on the kind of the organic solvent. It is, however, more preferred to use the organic solvent in a range of from 5 to 60 mass %. When a mixed medium of water and IPA is used, for example, the content of IPA in the mixed medium may preferably be from 1 to 40 mass %, with the incorporation of IPA in a range of from 5 to 40 mass % being particularly preferred. An organic solvent content of lower than 1 mass % can bring about no sufficient thickening effect for the slurry and can hardly inhibit the settling-out of the filler, and therefore, is not preferred. On the other hand, an organic solvent content of 70 mass % or higher leads to the precipitation of the polysaccharide-based polymer, and therefore, is not preferred either.

Organic solvents usable in the water-based slurry composition according to the present invention include alcohols such as methyl alcohol, ethyl alcohol, n-propyl alcohol, isopropyl alcohol (IPA), n-butyl alcohol, s-butyl alcohol, isobutyl alcohol and t-butyl alcohol (TBA); esters such as methyl acetate, ethyl acetate, n-propyl acetate, isopropyl acetate, n-butyl acetate, isobutyl acetate, methoxybutyl acetate, cellosolve acetate, amyl acetate, methyl lactate, ethyl lactate and butyl lactate; ketones such as acetone, methyl ethyl ketone, methyl isobutyl ketone, diisobutyl ketone and cyclohexanone; and amides such as N-methyl-2-pyrrolidone, N,N-dimethylacetamide and N,N-dimethylformamide, with the alcohols being particularly suitably usable. More specifically, alcohols, such as isopropyl alcohol, methyl alcohol, ethyl alcohol and t-butyl alcohol, and N-methyl-2-pyrrolidone are preferred, with isopropyl alcohol and t-butyl alcohol being particularly preferred. These alcohols may be used either singly or as a mixture.

Usable examples of the hydrophobic filler for use in the water-based slurry composition according to the present invention include carbon black, natural graphite, kish graphite, artificial graphite, acetylene black, Ketjenblack, furnace black, carbon nanotubes, carbon nanofibers, silica, talc, calcium carbonate, nickel powder, copper powder, silver powder, copper alloy powder, zinc oxide powder, tin oxide powder, indium oxide powder, silver-coated glass beads, nickel-coated glass beads, nickel-coated phenol resin powder, aluminum flakes, copper flakes, nickel flakes, aluminum fibers, stainless steel fibers, glass fibers, aluminum-coated glass fibers, nickel-coated mica, ceramics, pigments, magnetic particles, conductive particles, active substances, and the like. Among these, conductive carbon fillers, such as carbon black, acetylene black, Ketjenblack, furnace black, natural graphite, carbon nanofibers and carbon nanotubes, silica and the like can be suitably used.

The water-based slurry composition according to the present invention may preferably have such an adequate viscosity that its viscosity at 25° C. is from 100 to 20,000 mPa·s when measured at a rotational speed of 30 rpm by a Brookfield rotational viscometer (rotor Nos. 1 to 4). In addition, its pH may preferably be 6 or lower when measured at 25° C. after the slurry composition has been diluted with distilled water of the same weight. At a slurry viscosity of lower than 100 mPa·s, the effect to inhibit the settling-out of the filler cannot be brought about fully. At a slurry viscosity of higher than 20,000 mPa·s, on the other hand, the slurry viscosity is so high that the handling becomes difficult. Viscosities outside the above-described range are not preferred accordingly.

(Description about the Viscosity of Water-Organic Solvent System)

A discussion will be made about the increased viscosity of a water-organic solvent system which may be used as a preferred solvent for the retention of dispersibility in the water-based slurry composition according to the present invention. For example, the increased viscosity of a water-IPA solvent is considered to have a relevance to the formation of a hydration structure in an aqueous solution owing to the possession of both an isopropyl group as a hydrophobic group and a hydroxyl group as a hydrophilic group. Described specifically, as an alcohol is added to water, alcohol molecules progressively form water-associated units around them via hydrogen bonds so that the alcohol molecules progressively form complicated complexes with larger water clusters having a structure that water molecules themselves are associated with each other via hydrogen bonds. In such a state, the free volume in which single molecules of water and molecules of the alcohol can freely move is considered to decrease by the above-described interaction between the alcohol molecules and the water molecules although the degree of hydrogen bonds differs depending on the size and stereostructure of the hydrophobic group. As a result, the freedom of molecular motion is considered to be restrained. This restraint is considered to be one of main causes of the increased viscosity of the water-alcohol solution.

When dispersing a conductive filler such as, for example, carbon black as a hydrophobic filler, especially when dispersing acetylene black having a highly-developed structure, carbon fibers having a large aspect ratio, or the like, excessively-vigorous agitation has a potential problem that the conductive network may be destructed to result in reduced electrical conductivity. Dispersion under mild conditions is desired accordingly. Upon conducting dispersion under mild conditions, however, the possession of an adequate slurry viscosity (100 mPa·s to 20,000 mPa·s) is considered to apply proper shear force to the agglomerated filler during dispersion and hence to bring about improved dispersibility under such mild conditions.

The water-based slurry composition according to the present invention, which contains the hydrophobic filler, can be expected to find utility as coating formulations, which have low environmental load and are equipped with excellent filler dispersion properties, in various fields—such as paints, inks, magnets, ceramics, electricity storage devices, adhesives, electronic materials, liquid crystal color filters, pharmaceuticals, cosmetics, and fragrances—by choosing fillers having suitable functions depending on the application fields. Especially when a conductive filler such as carbon black is used, the water-based slurry composition can be effectively used as a coating formulation upon formation of a collector coating layer, electrode layer, separator layer or the like of an electricity storage device such as a lithium ion secondary cell or capacitor.

The water-based slurry composition according to the present invention contains a polybasic acid or a derivative thereof in addition to the above-described components, and may further contain a resin or the like which has hydroxyl groups and/or amino groups. The polysaccharide-based polymers useful in the present invention and containing hydroxyl groups in their molecules, such as cellulose, alginic acid, starch, chitosan and chitin, are known to afford films having excellent adhesiveness to metal materials such as aluminum. However, these films swell, for example, with a polar solvent such as water, and readily separate from the surfaces of such metal materials. Further, the use of the polysaccharide-based polymer or the like as a binder in a coating formulation for the production of electrode plates involves a problem in that the durability (electrolyte resistance) of the resulting coating film layer to a cell electrolyte such as ethylene carbonate or propylene carbonate is low, although the adhesiveness of the coating film layer to the collector is excellent.

With respect to this problem, the present inventors found that the addition of a polybasic acid or a derivative thereof (hereinafter called "the polybasic acid or the like") to the coating formulation for the production of electrode plates, said coating formulation making use of the polysaccharide-based polymer or the like as a binder, is effective. Described specifically, when a coating film layer is formed by using the water-based slurry composition according to the present invention, which contains the polysaccharide-based polymer or the like and the polybasic acid or the like, as a coating formulation, the polybasic acid or the like acts as a crosslinking agent for the polysaccharide-based polymer or the like during drying under heat so that the resulting film of the polysaccharide polymer or the like is no longer equipped with solubility and swellability in the organic solvent and electrolyte, thereby making it possible to form a coating film layer having excellent adhesiveness to the surface of the metal material and the collector and superb solvent resistance. Especially for the water-based slurry composition according to the present invention prepared as a coating formulation for an electrode plate of an electricity storage device, it is hence preferred to use a tribasic or higher polybasic acid or the like from the standpoint of crosslinking ability for the polymer. Further, the polybasic acid or the like also has a function to increase the solubility of the polysaccharide polymer or the like upon its dissolution in the water-based medium, and for this purpose, a dibasic polybasic acid or the like is also usable.

As the polybasic acid or the like for use in the present invention, one known to date can be used. Specifically, usable are polybasic acids themselves and acid anhydrides thereof; salts, notably ammonium salts and amine salts of some or all of the carboxyl groups of such polybasic acids; alkyl esters, amides, imides and amide-imides of some or all of the carboxyl groups of such polybasic acids; derivatives obtained by modifying ones or more of the carboxyl groups of these compounds with N-hydroxysuccinimide, N-hydroxysulfosuccinimide or a derivative thereof; and the like. Preferred as derivatives of these polybasic acids are compounds which regenerate polybasic acids upon heating of coating film layers to be formed subsequently.

Described specifically, it is preferred to use at least one polybasic acid, which is selected from the group consisting of the below-described polybasic acids, or its derivative, especially its acid anhydride.
<Dibasic acids> Oxalic acid, malonic acid, succinic acid, methylsuccinic acid, glutaric acid, methylglutaric acid, adipic acid, pimellic acid, suberic acid, azelaic acid, sebacic acid, maleic acid, methylmaleic acid, fumaric acid, methylfumaric acid, itaconic acid, muconic acid, citraconic acid, glutaconic acid, acetylenedicarboxylic acid, tartaric acid, malic acid, spiclisporic acid, glutamic acid, glutathione, aspartic acid, cystine, acetylcysteine, diglycolic acid, iminodiacetic acid, hydroxyethyliminodiacetic acid, thioglycolic acid, thionyldiglycolic acid, sulfonyldiglycolic acid, poly(oxyethylene)diglycolic acid (PEG acid), pyridinedicarboxylic acid, pyrazinedicarboxylic acid, epoxysuccinic acid, phthalic acid, isophthalic acid, terephthalic acid, tetrachlorophthalic acid, naphthalene dicarboxylic acid, tetrahydrophthalic acid, methyltetrahydrophthalic acid, cyclohexane dicarboxylic acid, diphenylsulfone dicarboxylic acid, and diphenylmethane dicarboxylic acid;
<Tribasic acids> Citric acid, 1,2,3-propanetricarboxylic acid, 1,2,4-butanetricarboxylic acid, 2-phosphono-1,2,4-butanetricarboxylic acid, trimellitic acid, and 1,2,4-cyclohexanetricarboxylic acid;
<Tetrabasic acids> Ethylenediaminetetraacetic acid, 1,2,3,4-butanetetracarboxylic acid, pyromellitic acid, 1,2,4,5-cyclohexanetetracarboxylic acid, and 1,4,5,8-naphthalenetetracarboxylic acid; and
<Hexabasic acids>1,2,3,4,5,6-Cyclohexanehexacarboxylic acid.

It is to be noted that in addition to the above-described polybasic acids, other polybasic acids such as those to be described below may also be used in combination in the present invention. Illustrative are tribasic acids such as isocitric acid, aconitic acid, nitrilotriacetic acid, hydroxyethylethylenediaminetriacetic acid, carboxyethylthiosuccinic acid, and trimesic acid; monocyclic tetracarboxylic acids such as ethylenediamine-N,N'-succinic acid, 1,4,5,8-naphthalenetetracarboxylic acid, pentenetetracarboxylic acid, hexenetetracarboxylic acid, glutamate diacetic acid, maleated methylcyclohexenetetracarboxylic acid, furantetracarboxylic acid, benzophenonetetracarboxylic acid, phthalocyaninetetracarboxylic acid, 1,2,3,4-cyclobutanetetracarboxylic acid, and cyclopentanetetracarboxylic acid; tetrabasic acids such as bicyclo ring systems represented by bicyclo[2,2,1]heptane-2,3,5,6-tetracarboxylic acid, bicyclo[2,2,2]octane-2,3,5,6-tetracarboxylic acid, and the like, and polycyclic tetracarboxylic acids having a norbornane ring or tetracyclo ring structure; pentabasic acids such as diethylenetriamine pentaacetic acid; phthalocyaninepolycarboxylic acid, phytic acid, hexametaphosphoric acid, polyphosphoric acid, polyacrylic acid, polymethacrylic acid, polyitaconic acid, polymaleic acid, and copolymers thereof; and styrene-maleic acid copolymer, isobutylene-maleic acid copolymer, vinyl ether-maleic acid copolymer, pectic acid, polyglutamic acid, polymalic acid, polyaspartic acid, acrylic acid-male ic acid-vinyl alcohol copolymer, and the like.

Among these, preferred from the standpoint of crosslinking ability or the like are 1,2,3-propanetricarboxylic acid, 1,2,4-cyclohexanetricarboxylic acid, 1,2,4,5-cyclohexanetetracarboxylic acid, 1,2,3,4-butanetetracarboxylic acid, pyromellitic acid, pyromellitic acid anhydride, trimellitic acid, trimellitic acid anhydride, adipic acid, citric acid tartaric acid, 1,4,5,8-naphthalenetetracarboxylic acid, and 1,2,3,4,5,6-cyclohexanehexacarboxylic acid.

The content of the polybasic acid or the like in the water-based slurry composition according to the present invention may be preferably from 10 to 300 parts by mass, more preferably from 20 to 200 parts by mass per 100 parts by mass of the polysaccharide-based polymer or the like. On the other hand, the content of the polybasic acid or the like per 100 parts by mass of the coating formulation may be preferably from 0.01 to 20 parts by mass, more preferably from 0.02 to 10 parts by mass. If the content of the polybasic acid or the like is lower than 0.01 parts by mass per 100 parts by mass of the coating formulation, the polysaccharide-based polymer or the like is provided with a low crosslink density, and the resulting coating film layer is insufficient in the adhesiveness to the collector and the polymer or the like is insufficient in insolubility, non-swellability and electrochemical stability to the electrolyte. Such an excessively low content is thus not preferred. On the other hand, a content higher than 20 parts by mass per 100 parts of the coating formulation provides the resulting film or coating film layer with reduced flexibility, and moreover, is uneconomical. Such an unduly high content is hence not preferred either.

[Application of Slurry Composition]
<Electrode Plate for Electricity Storage Device>

The water-based slurry composition according to the present invention, which contains the hydrophobic filler, is useful as a material for forming a coating film layer to be arranged on an electrode plate for an electricity storage device such as a secondary cell or capacitor when a conductive filler is used as the hydrophobic filler. In this case, it is preferred to form the coating film layer by using the water-based slurry composition according to the present invention, which contains the conductive filler, as a coating formulation for the coating film layer and applying the coating formulation onto a surface of a collector of the electricity storage device to a thickness of from 0.1 to 10 µm, preferably from 0.1 to 5 µm, more preferably from 0.1 to 2 µm in terms of solids. By forming a positive electrode layer for a cell, a negative electrode layer for the cell, a positive electrode layer for a capacitor, a negative electrode layer for the capacitor or a polarizable electrode layer over the coating film layer formed as described above, an electrode plate for an electricity storage device can be produced with a small resistance between the electrode layer and the collector and a small environmental load. The expression of this function can be achieved preferably by the use of the polysaccharide-based polymer or the like, which can exhibit a binding effect and a dispersion-improving effect at the same time, and more preferably by the additional use of a mixed medium of water and an organic solvent, especially a mixed medium of water and an alcohol, which can exhibit an improving effect on filler dispersibility owing to an increase in viscosity.

In the present invention, it is possible to provide various products—such as electrode plates for a cell or capacitor, said electrode plates each including a coating film layer formed and arranged between a collector and an electrode layer, and the cell or capacitor equipped with the electrode plates—by coating formulations making use of the water-based slurry composition which has the above-described makeup and contains the conductive filler.

In each of the above-described electrode plates, the binder for forming the electrode layer may be a solution of the polysaccharide-based polymer or the like, which functions as a binder for a coating film layer when the water-based slurry composition according to the present invention is used as a coating formulation. However, it is possible to additionally use a conventionally-known binder. Examples of the known binder usable in such a case include polyfluorinated vinylidene, polytetrafluoroethylene, acrylic resins, polyimide resins, polyamide-imide resins, silicone-acrylic resins, styrene-butadiene copolymer rubber, and the like. When such a conventionally-known binder is used, it has heretofore been essential to subject, for example, the surface of an aluminum foil to chemical treatment to provide improved adhesion between the electrode layer and the collector. In contrast, the use of the water-based slurry composition according to the present invention as a coating formulation can obviate such cumbersome and high cost chemical treatment, and can realize excellent adhesion and lower resistance with a single layer of coating. According to the present invention which can form such coating film layers, high-efficiency and long-life, cells and capacitors can be provided.

These coating film layers may preferably have a surface resistivity of 3,000Ω/□ or lower. Described specifically, if a coating film having a surface resistivity higher than 3,000Ω/□ is used in an electrode plate, the internal resistance increases, thereby making it difficult to obtain a high-efficiency and long-life, cell or capacitor. It is, therefore, preferred in the present invention to set the surface resistivity of each coating film layer at 3,000Ω/□ or lower, with 2,000Ω/□ or lower being more desired.

(Measurement of Surface Resistivity)

The surface resistivity that specifies each coating film in the present invention was measured by a method to be described next. After a coating formulation for a coating film is applied onto a glass plate, the coating formulation is dried at 200° C. for 1 minute to form the coating film (dry film thickness: 4 μm). The surface resistivity of the coating film is then determined by the four-point probe method in accordance with JIS K 7194. In the present invention, the measurement was conducted under conditions of 25° C. and 60% relative humidity by using a "LORESTA-GP MCP-T610" (manufactured by Mitsubishi Chemical Analytech Co., Ltd.).

Polysaccharides such as chitosan derivatives, chitin derivatives, cellulose derivatives, starch derivatives and alginic acid derivatives are polysaccharide-based polymers useful as resin binders in the water-based slurry composition according to the present invention prepared as the coating formulation for the electrode plate of the electricity storage device. These polysaccharides are available from the market and can be used as they are. From the standpoint of solubility in water and organic solvents, however, it is more preferred to use such derivatives of polysaccharide-based polymers as described above.

The content of the polysaccharide-based polymer or the like as a resin binder in the above-described coating formulation for the electrode plate of the electricity storage device may range preferably from 0.1 to 40 parts by mass, more preferably from 1 to 20 parts by mass in terms of solids content per 100 parts by mass of the coating formulation from the viewpoints of coating applicability, transport cost and the like. An unduly low content of the polymer or the like provides the resulting coating film with insufficient strength and adhesiveness so that the components of the coating film tend to fall off from the coating film layer, and therefore, such an unduly low content is not preferred. An excessively high content of the polymer or the like makes it difficult to obtain a uniform solution, and moreover, involves a potential problem in that the conductive filler (hydrophobic filler) may be covered under the polymer or the like to provide the resulting electrode plate with an increased internal resistance.

As the conductive hydrophobic filler (hereinafter called "the conductive filler") for use in the water-based slurry composition according to the present invention prepared as the coating formulation for the electrode plate of the electricity storage device, any conductive filler can be used including one in the form of particles, flakes or short fibers or one obtained by coating a substrate with a conductive material. Described specifically, particulate conductive fillers include carbon black, acetylene black, Ketjenblack, nickel powder, copper powder, silver powder, copper alloy powder, zinc oxide powder, tin oxide powder, indium oxide powder, and the like. Flaky conductive fillers include natural graphite, kish graphite, artificial (man-made) graphite, aluminum flakes, copper flakes, nickel flakes, and the like. Conductive fillers in the form of short fibers include PAN-based carbon fibers, pitch-based carbon fibers, carbon nanotubes, stainless fibers, aluminum fibers, and the like. Further, conductive fillers obtained by coating substrates with conductive materials include silver-coated glass beads, nickel-coated glass beads, nickel-coated phenol resin, nickel-coated mica, aluminum-coated glass fibers, and the like.

The above-exemplified conductive fillers are each used in a form that it is mixed and dispersed in a coating formulation. The inclusion of the conductive filler allows the resulting coating film to achieve further improved electrical contact, and can provide a reduced internal resistance and an increased capacity density. The content of the conductive filler may range generally from 0.1 to 30 parts by mass, preferably from 1 to 20 parts by mass per 100 parts by mass of the coating formulation. If the content of the conductive filler is lower than 0.1 parts by mass, the resulting coating film layer may be provided with insufficient electrical conductivity. If the content of the conductive filler is higher than 30 parts by mass, on the other hand, one or more of the remaining components may become insufficient so that the resulting film layer may be reduced in performance.

As the polybasic acid or the like and the organic solvent for use in the coating formulation for the electricity storage device in the present invention, those available on the market can be used as they are, or may be used after purification as needed. As the order of addition of the polymer or the like and the polybasic acid or the like to the water/organic solvent upon their dissolution in the solvent in the preparation of the polymer solution containing the polysaccharide-based polymer or the like employed as a resin binder, either of the polymer or the like and the polybasic acid or the like may be added first or both of them may be added concurrently. As a dissolution method, room-temperature stirring is sufficient, but heating may also be conducted as needed.

The coating formulation for the electrode plate of the electricity storage device, said coating formulation making use of the water-based slurry composition according to the present invention, can be obtained by adding the polysaccharide-based polymer or the like, the conductive filler and the polybasic acid or the like to the water/organic solvent and kneading the resultant mixture. As the proportions of the respective components after having been prepared into the coating formulation, it is particularly preferred that, when the coating formulation is assumed to be 100 parts by mass, the polymer or the like amounts to from 0.5 to 10 parts by mass, the polybasic acid or the like amounts to from 0.02 to 10 parts by mass, and the conductive filler amounts to 1 to 20 parts by mass. Further, the solids content of the coating formulation may range preferably from 0.1 to 40 mass %, more preferably from 1 to 35 mass %.

The coating formulation for the electricity storage device, which is used in the present invention, can also contain one or more optional components other than the above-described components, for example, one or More of other crosslinking agents and the like. Examples of the other crosslinking agents include epoxy compounds such as ethylene glycol diglycidyl ether, polyethylene glycol diglycidyl ether and glycerol polyglycidyl ether; isocyanate compounds such as toluoylene diisocyanate, xylylene diisocyanate, hexamethylene di isocyanate and phenyl diisocyanate, and blocked isocyanate compounds formed by blocking such isocyanate compounds with blocking agents such as phenols, alcohols, active methylene compounds, mercaptans, acid-amides, imides, amines, imidazoles, ureas, carbamic acids, imines, oximes or sulfites; and aldehyde compounds such as glyoxal, glutaraldehyde, and dialdehyde starch.

Also included are (meth)acrylate compounds such as polyethylene glycol diacrylate, polyethylene glycol dimethacrylate and hexanediol diacrylate; methylol compounds such as methylolmelamine and dimethylol urea; organic acid metal salts such as zirconyl acetate, zirconyl carbonate and titanium lactate; and metal alkoxide compounds such as aluminum trimethoxide, aluminum tributoxide, titanium tetraethoxide, titanium tetrabutoxide, zirconium tetrabutoxide, aluminum dipropoxide acetylacetonate, titanium dimethoxide bis(acetylacetonate) and titanium dibutoxide bis(ethylacetoacetate).

Further included are silane coupling agents such as vinylmethoxysilane, vinylethoxysilane, 3-glycidoxypropyltrimethoxysilane, 3-glycidoxypropyltriethoxysilane, 3-methacryloxypropyltrimethoxysilane, 3-aminopropyltrimethoxysilane, 3-aminopropyltriethoxysilane, 3-isocyanatopropyltriethoxysilane and imidazolesilane; silane compounds such as methyltrimethoxysilane, tetraethoxysilane and methyltriethoxysilane; and carbodiimide compounds and the like. The use of these crosslinking agents is not essential. When they are used, however, the content of one or more of such crosslinking agents may suitably range from 1 to 100 mass % based on the polysaccharide-based polymer or the like.

A description will now be made about a specific method for the preparation of the coating formulation, which is useful in the present invention for the production of the electrode plate of the electricity storage device. First, the coating formulation is prepared by adding the polysaccharide-based polymer or the like suitably selected as a resin binder from such materials as described above, the conductive filler and the polysaccharide or the like to the water/organic solvent such that the content of water becomes 30 mass % or higher, and mixing and dispersing them in a conventionally-known mixer. As the mixer, a ball mill, sand mill, pigment disperser, mix-muller, ultrasonic disperser, homogenizer, planetary mixer, Hobart mixer, or the like can be used. Also preferred is a method that firstly mixes the conductive filler in a mixer such as a mix-muller, planetary mixer, Henschel mixer or omni-mixer, and then adds the polysaccharide-based polymer or the like as a resin binder and the polybasic acid or the like to the resultant mixture and mixes them until homogeneous. Adoption of such a method makes it possible to readily obtain a uniform coating formulation.

The viscosity of the coating formulation prepared as described above is generally from 10 to 100,000 mPa·s, preferably from 50 to 50,000 mPa·s, more preferably from 100 to 20,000 mPa·s although it varies depending on the type of the coating machine and the layout of the coating line. No particular limitation is imposed on the amount of the coating formulation to be applied. In general, however, the coating formulation may be applied in such an amount that the coating film layer to be formed subsequent to drying will have a thickness of usually from 0.05 to 100 μm, preferably from 0.1 to 10 μm. It is to be noted that the above-described values are viscosities at 25° C. when measured at a rotational speed of 30 rpm by a Brookfield rotational viscometer.

The production method of an electrode plate in the present invention is characterized in that with the coating formulation of the above-described makeup, a coating film is formed and arranged between a collector and an electrode. As the collector useful in the production of the electrode plate, a material having electrical conductivity and electrochemical durability is used. Among such materials, preferred are metal materials such as aluminum, tantalum, niobium, titanium, nickel, hafnium, zirconium, zinc, tungsten, bismuth, antimony, stainless steel, copper, gold and platinum, with aluminum being particularly preferred as it has excellent corrosion resistance to the electrolyte, is light weight, and permits easy machining. No particular limitation is imposed on the shape of the collector. In general, however, a sheet-shaped collector (metal foil) having a thickness of from 5 to 30 μm or so can be employed. Such a collector may be treated beforehand at a surface thereof with a silane-based, titanate-based or aluminum-based coupling agent.

The coating film layer can be obtained by applying the coating formulation onto the surface of the collector to a dry thickness in a range of from 0.1 to 10 μm, preferably from 0.1 to 5 μm, more preferably from 0.1 to 2 μm by using one of various coating methods such as gravure coating, gravure reverse coating, roll coating, Meyer bar coating, blade coating, knife coating, air knife coating, comma coating, slot die coating, slide die coating, dip coating, extrusion coating, spray coating and brush coating and then drying the thus-applied coating formulation under heat. If the thickness of the coating film is smaller than 0.1 μm, uniform coating is difficult. A thickness greater than 10 μm, on the other hand, may provide the coating film with reduced flexibility.

Upon drying under heat, the coating film layer may be heated preferably at 100° C. or higher for 1 second or longer, more preferably at 100 to 250° C. for 1 second to 60 minutes so that the polysaccharide-based polymer or the like as a resin binder such that the resulting coating film layer can be provided with improved adhesiveness to the collector and the resin binder can be provided with improved electrochemical stability to the electrolyte. A heat treatment condition of lower than 100° C. or shorter than 1 second may fail to provide the coating film layer with satisfactory adhesiveness to the collector and also to provide the resin binder with satisfactory electrochemical stability to the electrolyte. Such a heat treatment condition is hence not preferred.

In addition, an electrode layer is applied over the coating film layer, which has been formed by conducting coating and drying processing as described above, to form an electrode plate. To further improve its uniformity, it is also preferred to form the electrode plate according to the present invention by applying pressing treatment to the electrode layer while using metal rolls, heating rolls, a sheet press or the like. As a pressing condition for the pressing treatment, a press pressure of lower than 500 kgf/cm² can hardly provide the electrode layer with uniformity, while a press pressure of higher than 7,500 kgf/cm² breaks the electrode plate itself including the collector. As the pressing condition, a range of from 500 to 7,500 kgf/cm² is therefore preferred.

In the electrode plate obtained as described above, the coating film layer made of the conductive filler and the polysaccharide-based polymer or the like (resin binder) crosslinked with the polybasic acid or the like is formed and arranged between the collector and the electrode layer, and the coating film layer is equipped with such properties as described above.

When manufacturing a nonaqueous electrolyte secondary cell, for example, a lithium-based secondary cell by using the positive and negative electrode plates of the present invention produced as described above, a nonaqueous electrolyte with a lithium salt dissolved as a solute in an organic solvent or ionic liquid is used as an electrolyte. Usable examples of the lithium salt as the solute that forms the nonaqueous electrolyte include inorganic lithium salts such as $LiClO_4$, $LiBF_4$, $LiPF_6$, $LiAsF_6$, $LiCl$ and $LiBr$; and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$ $LiOSO_2C_6F_{13}$ and $LiOSO_2C_7F_{15}$.

As the organic solvent, a cyclic ester, a linear ester, a cyclic ether, a linear ether or the like can be mentioned. Illustrative of the cyclic ester are ethylene carbonate, propylene carbonate, butylene carbonate, γ-butyrolactone, vinylene carbonate, 2-methyl-γ-butyrolactone, acetyl-γ-butyrolactone, and γ-valerolactone.

Illustrative of the linear ester are dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates.

Illustrative of the cyclic ether are tetrahydrofuran, alkyltetrahydrofurans, dialkylalkyltetrahydrofurans, alkoxytetrahydrofurans, dialkoxytetrahydrofurans, 1,3-dioxolane, alkyl-1,3-dioxolanes, and 1,4-dioxolane. Illustrative of the linear ether are 1,2-dimethoxyethane, 1,2-diethoxyethane, diethyl ether, ethylene glycol dialkyl ethers, diethylene glycol dialkyl ethers, triethylene glycol dialkyl ethers, and tetraethylene glycol dialkyl ethers.

The ionic liquid in which the lithium salt is dissolved is a liquid formed solely of ions consisting of organic cations and anions in combination. The organic cations can be, for example, at least one kind of organic cations of dialkylimidazolium cations such as 1-ethyl-3-methylimidazolium ions, trialkylimidazolium cations such as 1,2-dimethyl-3-propylimidazolium ions, tetraalkylammonium ions such as dimethylethylmethoxyammonium ions, alkylpyridinium ions such as 1-butylpyridinium ions, dialkylpyrrolidinium ions such as methylpropylpyrrolidinium ions, and dialkylpiperidinium ions such as methylpropylpiperidinium ions.

As the anions to be paired with these organic cations, $AlCl_4^-$, $PF_6^-$, $PF_3(C_2F_5)_3^-$, $PF_3(CF_3)_3^-$, $BF_4^-$, $BF_2(CF_3)_2^-$, $BF_3(CF_3)^-$, $CF_3SO_3^-$ (TfO: triflate anions), $(CF_3SO_2)_2N^-$ (TFSI: trifluoromethanesulfonyl), $(FSO_2)_2N^-$ (FSI: fluorosulfonyl), $(CF_3SO_2)_3C^-$ (TFSM), or the like can be used. It is to be noted that the remaining construction of the cell is the same as in the conventional art.

<Capacitor>

A description will hereinafter be made about a case in which coating film layers formed with a coating formulation making use of the water-based slurry composition according to the present invention are used in the production of electrode plates for a capacitor and the capacitor. The coating formulation for the electrode plates of the capacitor also contains the above-described polysaccharide-based polymer or the like, polybasic acid or the like, and conductive filler.

The content of the polysaccharide-based polymer or the like as a resin binder in the coating formulation upon formation of the coating films may be preferably from 0.1 to 20 parts by mass, more preferably from 0.5 to 10 parts by mass in terms of solids content per 100 parts by mass of the coating formulation. An unduly low content of the polymer or the like makes the components of each coating film easier to fall off from the coating film layer, and therefore, is not preferred. An excessively high content of the polymer or the like, on the other hand, involves a potential problem in that the conductive filler may be covered under the polymer or the like to provide the electrode plate with an increased internal resistance, and therefore, is not preferred either.

As the polybasic acid or the like in this case, a conventionally-known free polybasic acid or its derivative can be used. Among such polybasic acids and the like, particularly preferred from the standpoint of crosslinking ability for the polysaccharide-based polymer or the like used as a resin binder are tribasic and higher polybasic acids and the like, that is, 1,2,3-propanetricarboxylic acid, 1,2,4-cyclohexanetricarboxylic acid, 1,2,4,5-cyclohexanetetracarboxylic acid, 1,2,3,4-butanetetracarboxylic acid, trimellitic acid, pyromellitic acid, 1,4,5,8-naphthalenetetracarboxylic acid and 1,2,3,4,5,6-cyclohexanehexacarboxylic acid, and their acid anhydrides. These polybasic acids and the like are each used by mixing it in the above-described coating formulation.

The content of the polybasic acid or the like in the coating formulation to be used upon formation of the coating film may be preferably from 1 to 150 parts by mass, more preferably from 2 to 100 parts by mass per 100 parts by mass of the polysaccharide-based polymer or the like. If the content of the polybasic acid or the like is lower than 1 parts by mass, the crosslinked polymer is provided with a low crosslink density, and the resulting coating film layer is insufficient in the adhesiveness to the collector and the crosslinked polymer is insufficient in insolubility, non-swellability and electrochemical stability to the electrolyte. Such an excessively low content is thus not preferred. On the other hand, a content higher than 150 parts by mass provides the resulting film or coating film layer with reduced flexibility and hence, is not preferred, and moreover, is uneconomical.

As the conductive filler, a conductive carbon such as acetylene black, Ketjenblack or carbon black can be used. These conductive fillers are each used by mixing it in the above-described coating formulation. The use of the conductive material allows the resulting coating film to achieve further improved electrical contact, and can provide the resulting capacitor with a reduced internal resistance and an increased capacity density. The content of the conductive filler may range generally from 0.01 to 20 parts by mass, preferably from 1 to 15 parts by mass per 100 parts by mass of the coating formulation.

The coating formulation can be prepared by mixing the solution of the polysaccharide-based polymer or the like, the polybasic acid or the like and the conductive filler in a mixer. As the mixer, a ball mill, sand mill, pigment disperser, mix-muller, ultrasonic disperser, homogenizer, planetary mixer, Hobart mixer, or the like can be used. Also preferred is a method that firstly mixes the conductive filler in a mixer such as a mix-muller, planetary mixer, Henschel mixer or omnimixer, and then adds the solution of the polysaccharide-based polymer or the like as a resin binder to the resultant mixture and mixes them until homogeneous. Adoption of this method makes it possible to readily obtain a uniform coating formulation.

The capacitor electrode plate according to the present invention is obtained by applying the coating formulation, which contains the solution of the polysaccharide-based polymer or the like, the polybasic acid or the like and the conductive filler, between a collector and an electrode layer, and then drying the coating formulation to form a coating film layer. As the collector, a material having electrical conductivity and electrochemical durability can be used. From the viewpoint of the possession of heat resistance, a metal material such as aluminum, titanium, tantalum, stainless steel, gold or platinum is preferred, with aluminum or platinum being particularly preferred. No particular limitation is imposed on the shape of the collector. In general, however, a sheet-shaped collector having a thickness of from 0.001 to 0.5 mm or so can be employed.

No particular limitation is imposed on the forming method of the coating film layer. Preferred is a method that applies the coating formulation for the capacitor electrode between the collector and the electrode layer, and then dries the coating formulation to form a coating film layer between the collector and the electrode layer. As an application method of the coating formulation, a method such as, for example, doctor blade coating, dip coating, reverse roll coating, direct roll coating, gravure coating, extrusion coating, brush coating or spray coating can be mentioned.

The viscosity of the coating formulation may be generally from 10 to 100,000 mPa·s, preferably from 50 to 50,000 mPa·s, more preferably from 100 to 20,000 mPa·s, although it differs depending on the type of the coating machine and the layout of the coating line. No particular limitation is imposed on the amount of the coating formulation to be applied. In general, however, the coating formulation may be applied in such an amount that the coating film layer to be formed subsequent to the elimination of the solvent by drying will have a thickness of usually from 0.05 to 100 µm, preferably from 0.1 to 10 µm, more preferably from 0.1 to 2 µm. The drying method and drying conditions for the coating film layer are similar to those described above in connection with the cell electrode plates.

The capacitor according to the present invention, which has the above-described electrode plates, can be manufactured in a usual manner by using parts such as the electrode plates, an electrolyte and a separator. Described specifically, it can be manufactured, for example, by stacking the electrode plates together with the separator interposed therebetween, rolling or folding the resultant stack into a form conforming to the capacitor, placing the rolled or folded stack in a can, filling the electrolyte into the can, and sealing the can.

The electrolyte may preferably be, but is not limited particularly to, a nonaqueous electrolyte with an electrolyte dissolved in an organic solvent. As an electrolyte for an electric double-layer capacitor, for example, any electrolyte known to date can be used. Illustrative are tetraethylammonium tetrafluoroborate, triethylmonomethylammonium tetrafluoroborate, tetraethylammonium hexafluorophosphate, and the like. As an electrolyte for a lithium ion capacitor, on the other hand, a lithium salt such as LiI, LiClO$_4$, LiAsF$_6$, LiBF$_4$ or LiPF$_6$ can be mentioned.

No particular limitation is imposed on the solvent (electrolyte solvent) for dissolving such an electrolyte, insofar as it is commonly employed as an electrolyte solvent. Specific examples include carbonates such as propylene carbonate, ethylene carbonate and butylene carbonate; lactones such as γ-butyrolactone; sulfolanes; and nitriles such as acetonitrile. They can be used either singly or as a mixed solvent of two or more of them. Among these, carbonates are preferred for their high withstand voltage. The concentration of the electrolyte may be generally 0.5 mole/L or higher, preferably 0.8 mole/L or higher.

As the separator, a known separator can be used such as a microporous membrane or nonwoven fabric made of a polyolefin such as polyethylene or polypropylene; or a porous membrane made of pulp as a primary raw material and generally called "electrolytic capacitor paper". The separator may also be formed by dispersing inorganic ceramic powder and a resin binder in a solvent, coating the resultant dispersion onto an electrode layer, and then drying the coating. A solid electrolyte or gel electrolyte may also be used instead of the separator. As other materials such as the can, those employed in usual capacitors are all usable.

EXAMPLES

The present invention will next be described more specifically based on examples and comparative examples. It is to be noted that all designations of "parts" or in the following examples and comparative examples are on a weight basis. It is also to be noted that the present invention shall not be limited by these examples.

<Preparation of Various Polymer Solutions>

The compositions of the respective polymer solutions employed in the examples and comparative examples are shown in Table 1. Concerning the polybasic acids and the like used in the various polymer solutions, the following abbreviations are used: PTC for 1,2,3-propanetricarboxylic acid, CHTC for 1,2,4,5-cyclohexanetetracarboxylic acid, BTC for 1,2,3,4-butanetetracarboxylic acid, NTC for 1,4,5,8-naphthalenetetracarboxylic acid, and CHHC for 1,2,3,4,5,6-cyclohexanehexacarboxylic acid. As to the organic solvents used in the respective polymer solutions, on the other hand, the following abbreviations are used: MeOH for methyl alcohol, EtOH for ethyl alcohol, IPA for isopropyl alcohol, TBA for t-butyl alcohol, and NMP for N-methyl-2-pyrrolidone.

<Sample 1-1>

Glycerylatedchitosan (10 parts) was dispersed in deionized water (75 parts). Subsequent to the addition of BTC (10 parts) to the dispersion, the resulting mixture was stirred at room temperature for 4 hours to achieve dissolution. In the resultant solution, IPA (5 parts) was then mixed under stirring to prepare a solution of glycerylated chitosan in water/IPA (100 parts).

<Samples 1-2 to 1-20>

Individual water-based polymer solutions, which are each applicable to the coating formulation according to the present invention, were prepared in a similar manner as in Sample 1-1 except that the kind and content (weight) of the polymer, the kind and content of the polybasic acid or the like, the kind and content of the organic solvent and the mixing ratio of water to the organic solvent were varied as shown in Table 1.

<Sample 1-21>

Glycerylated chitosan (2 parts) was dispersed in deionized water (20 parts). Subsequent to the addition of BTC (2 parts) to the dispersion, the resulting mixture was stirred at room temperature for 4 hours to achieve dissolution. When IPA (76 parts) was then mixed under stirring, precipitation of glycerylated chitosan took place, thereby failing to obtain a good polymer solution usable as a slurry according to the present invention, an object of which is to form a good coating film layer.

TABLE 1

Polymer Solutions

| | Polymer | | Polybasic acid | | Water/organic solvent | | |
| | | | | | Water | Organic solvent | |
| Sample | Kind | parts | Kind | parts | Water | Kind | parts |
|---|---|---|---|---|---|---|---|
| 1-1 | Glycerylated chitosan | 10 | BTC | 10 | 75 | IPA | 5 |
| 1-2 | Glycerylated chitosan | 5 | BTC | 5 | 72 | IPA | 18 |
| 1-3 | Glycerylated chitosan | 5 | BTC | 5 | 63 | IPA | 27 |
| 1-4 | Glycerylated chitosan | 5 | BTC | 5 | 54 | IPA | 36 |
| 1-5 | Glycerylated chitosan | 5 | BTC | 5 | 36 | MeOH | 54 |
| 1-6 | Glycerylated chitosan | 5 | CHTC | 2 | 45 | EtOH | 48 |
| 1-7 | Glycerylated chitosan | 8 | Pyromellitic acid | 2 | 63 | TBA | 27 |
| 1-8 | Glycerylated chitosan | 10 | NTC | 2 | 84 | Ethyl acetate | 4 |
| 1-9 | Glycerylated chitosan | 5 | PTC | 5 | 54 | Acetone | 36 |
| 1-10 | Glycerylated chitosan | 3 | CHHC | 5 | 52 | NMP | 40 |
| 1-11 | Hydroxyethylchitosan | 10 | Pyromellitic acid | 5 | 54 | IPA | 31 |
| 1-12 | Hydroxypropylchitosan | 10 | Trimellitic acid | 6 | 42 | IPA | 42 |
| 1-13 | Hydroxybutylchitosan | 5 | Pyromellitic acid anhydride | 5 | 63 | IPA | 27 |
| 1-14 | Hydroxyethylcellulose | 5 | Adipic acid | 5 | 63 | EtOH | 27 |
| 1-15 | Hydroxypropylcellulose | 5 | Citric acid | 3 | 52 | MeOH | 40 |
| 1-16 | Carboxymethylcellulose | 5 | BTC | 3 | 82 | NMP | 10 |
| 1-17 | Cationized cellulose | 5 | Pyromellitic acid | 2 | 83 | IPA | 10 |
| 1-18 | Hydroxyethyl starch | 5 | Tartaric acid | 2 | 43 | MeOH | 50 |
| 1-19 | Propylene glycol alginate | 5 | Trimellitic acid anhydride | 3 | 80 | IPA | 12 |
| 1-20 | Glycerylated chitosan | 5 | BTC | 5 | 90 | — | — |
| 1-21 | Glycerylated chitosan | 2 | BTC | 2 | 20 | IPA | 76 |

<Preparation and Evaluation of Slurry Compositions and Coating Films>

Example 1

Slurry Composition

A slurry composition employed in this example and containing a hydrophobic filler was prepared in a manner to be described hereinafter. Acetylene black as the hydrophobic filler and the polymer solution of Sample 1-1 in Table 1 were stirred and mixed at a mixing ratio of 10 parts to 90 parts at a rotational speed of 60 rpm for 1.20 minutes in a planetary mixer to obtain a slurry composition.

The viscosity of the slurry composition obtained as described above was measured by a Brookfield rotational viscometer (25° C., 30 rpm, rotor No. 3). The viscosity of the slurry was 0.9 Pa·s.

The resultant slurry composition was applied and spread on a glass plate by a bar coater No. 6. The appearance of the resulting coating film was visually examined to evaluate the dispersibility of the hydrophobic filler. Dispersibility was evaluated as "good" when a coating film was uniform and neither of seeding, streaks and irregularities were observed, while dispersibility was evaluated as "bad" when seeding, streaks and/or irregularities were observed in a coating film.

Also to confirm the storage stability of the slurry composition obtained as described above, the slurry composition was placed in a 500-mL glass vessel, and was stored by allowing it to stand for one month at room temperature. The conditions of the slurry composition after the storage were observed to evaluate it. A slurry composition was evaluated as "A" when neither the formation of a supernatant or the precipitation of a filler were observed. A slurry composition was evaluated as "B" when the formation of a supernatant and the precipitation of a filler were observed but the filler was redispersed when the vessel was lightly shaken. A slurry composition was evaluated as "C" when the formation of a supernatant and the precipitation of a filler were observed, the filler was not redispersed when agitated to such an extent as the vessel was lightly shaken, and redispersion by a disperser was needed.

(Coating Film)

Using the slurry composition obtained as described above and employing, as a substrate, a collector formed of a 20-μm thick aluminum foil, the slurry composition was applied onto one side of the substrate by a comma roll coater. The thus-coated substrate was then dried for 2 minutes in an oven controlled at 110° C., and was further dried for 2 minutes in the oven controlled at 180° C. to eliminate the solvent and to have the polymer component crosslinked, so that a coating film (coating film layer) was formed with a dry thickness of 1 μm on the collector.

Parallel lines, which consisted of perpendicularly-intersecting 11 vertical lines and 11 horizontal lines, were drawn by a cutter at intervals of 1 mm on the coating film layer obtained as described above so that 100 squares were formed within 1 cm$^2$. A mending tape was applied to the surface of the coating film layer, and tape peeling was then conducted. The number of squares which were not peeled off was determined as a measure of adhesiveness to the collector. The average of 10 tests was 99.0 squares. Further, the conditions of the coating film layer were observed after the coating film layer with the squares formed thereon as described above was immersed at 70° C. for 72 hours in a solution prepared by dissolving LiPF$_3$ (1 mole) as a supporting salt in a mixed solvent of EC (ethylene carbonate), PC (propylene carbonate) and DME (dimethoxyethane) combined together at a volume ratio of 1:1:2. One developed no changes is indicated as "none" under "solubility/swellability", while one with its coating film layer having been peeled or swollen is indicated as "equipped" under "solubility/swellability".

Also to evaluate the electrical conductivity of the above-described coating film layer, the slurry composition was applied onto a glass plate by a comma roll coater, and the thus-coated glass plate was then dried for 1 minute in an oven controlled at 200° C. to form a conductive coating film (dry thickness: 4 μm). The surface resistivity of the resultant coating film was determined by the four-point probe method in accordance with JIS K 7194. The measurement was conducted under the conditions of 25° C. and 60% relative humidity by using a "LORESTA-GP MCP-T600" (manufactured by Mitsubishi Chemical Corporation).

Examples 2 to 19, Comparative Examples 1 to 3

Slurry compositions and coating films were prepared in a similar manner as in Example 1 except that the polymer solutions and conductive fillers described in Table 2 were used in place of the polymer solution and conductive filler in Sample 1-1 of Example 1. The viscosity (25° C., 30 rpm; upon measurement, a rotor was selected as desired depending on the viscosity, and was used), dispersibility and storage stability of each slurry composition, and the adhesiveness, solubility/swellability and surface resistivity of the resulting coating film were then determined, and the results are shown in Table 2. It is to be noted that a 5% solution of polyvinylidene fluoride in NMP (hereinafter referred to as "the PVDF solution") was used as a binder resin in Comparative Example 2 and a styrene-butadiene copolymer latex (with the use of sodium carboxymethylcellulose as a thickener) was used as a binder resin in Comparative Example 3.

Application to Cells

Example 20

Positive Electrode Plate, Negative Electrode Plate, Cell (Positive Electrode Plate)

Using the slurry composition of Example 1 and employing, as a substrate, a collector formed of a 20 μm thick aluminum foil, the slurry composition was applied onto one side of the substrate by a comma roll coater. The thus-coated substrate was then dried for 2 minutes in an oven control led at 110° C., and was further dried for 2 minutes in the oven controlled at 180° C. to eliminate the solvent and to have the polymer component cross linked, so that a coating film was formed with a dry thickness of 1 μm on the collector.

Next, a positive electrode formulation with a positive-electrode active material contained therein was prepared in a manner to be described hereinafter. As materials for the positive electrode formulation, $LiCoO_2$ powder having particle sizes of from 1 to 100 μm, acetylene black as a conductive aid and the PVDF solution as a binder were stirred and mixed at a mixing ratio of 90 parts, 5 parts and 50 parts at a rotational speed of 60 rpm for 120 minutes in a planetary mixer to obtain a slurry-form, positive electrode formulation with the positive-electrode active material contained therein.

TABLE 2

Compositions and Physical Properties of Slurry Compositions

| | Polymer solution | Kind and content of filler in 100 parts of slurry composition | | Viscosity of slurry (Pa·s) | Dispersibility | Storage stability | Adhesiveness (av. value) | Solubility/ swellability | Surface resistivity (Ω/□) |
|---|---|---|---|---|---|---|---|---|---|
| | | Kind | Content | | | | | | |
| Ex. 1 | Sample 1-1 | AB | 10 | 0.9 | Good | B | 99 | None | 1,300 |
| Ex. 2 | Sample 1-2 | AB | 5 | 2.7 | Good | A | 100 | None | 1,200 |
| Ex. 3 | Sample 1-3 | AB | 5 | 9.4 | Good | A | 100 | None | 1,300 |
| Ex. 4 | Sample 1-4 | AB | 5 | 9.3 | Good | A | 100 | None | 1,100 |
| Ex. 5 | Sample 1-5 | AB | 5 | 1.5 | Good | A | 99 | None | 1,000 |
| Ex. 6 | Sample 1-6 | AB | 5 | 3.1 | Good | A | 95 | None | 1,200 |
| Ex. 7 | Sample 1-7 | AB | 8 | 6.0 | Good | A | 92 | None | 730 |
| Ex. 8 | Sample 1-8 | AB | 10 | 1.3 | Good | A | 90 | None | 540 |
| Ex. 9 | Sample 1-9 | AB | 5 | 0.8 | Good | B | 100 | None | 940 |
| Ex. 10 | Sample 1-10 | AB | 5 | 0.5 | Good | B | 97 | None | 1100 |
| Ex. 11 | Sample 1-11 | AB | 10 | 16.4 | Good | A | 98 | None | 690 |
| Ex. 12 | Sample 1-12 | AB | 15 | 19.7 | Good | A | 99 | None | 460 |
| Ex. 13 | Sample 1-13 | AB | 10 | 4.9 | Good | A | 100 | None | 830 |
| Ex. 14 | Sample 1-14 | KB | 3 | 11.7 | Good | A | 94 | None | 880 |
| Ex. 15 | Sample 1-15 | FB | 5 | 5.2 | Good | A | 96 | None | 2,900 |
| Ex. 16 | Sample 1-16 | AB | 10 | 2.9 | Good | A | 98 | None | 620 |
| Ex. 17 | Sample 1-17 | AB | 8 | 1.7 | Good | A | 97 | None | 750 |
| Ex. 18 | Sample 1-18 | AB | 10 | 2.3 | Good | A | 95 | None | 510 |
| Ex. 19 | Sample 1-19 | CNT | 2 | 3.5 | Good | A | 91 | None | 230 |
| Comp. Ex. 1 | Sample 1-20 | AB | 5 | 0.09 | Bad | C | 99 | None | 3,700 |
| Comp. Ex. 2 | PVDF solution | AB | 5 | 3.6 | Good | A | 37 | Equipped | 1,800 |
| Comp. Ex. 3 | SBR + CMC dispersion | AB | 5 | 2.1 | Good | A | 95 | Equipped | 2,000 |

AB: Acetylene black ("DENKA BLACK HS-100", product of Denki Kagaku Kogyo Kabushiki Kaisha)
KB: Ketjenblack ("ECP600JD", product of Lion Corporation)
FB: Furnace black ("TOKA BLACK #4500", product of Tokai Carbon Co., Ltd.)
CNT: Carbon nanotubes (multilayer type, diameter: 40 to 60 nm, length: 1 to 2 μm. product of Tokyo Chemical Industry Co., Ltd.)
SBR: Styrene-butadiene copolymer latex ("NALSTAR SR-112", product of Nippon A & L Inc.)
CMC: Sodium carboxymethylcellulose ("SUNROSE F-600LC", product of Nippon Paper Chemicals Co., Ltd.)

Using the positive electrode formulation obtained as described above, the positive electrode formulation was applied onto the surface of the coating film layer on the positive electrode collector by a comma roll coater. The thus-coated positive electrode collector was then dried for 2 minutes in an oven controlled at 110° C., and was further dried for 2 minutes in the oven controlled at 180° C. to eliminate the solvent, so that a positive-electrode composite layer with an active material layer formed with a dry thickness of 100 m on the coating film layer was obtained. The positive-electrode composite layer obtained in the above-described manner was pressed under a condition of 5,000 kgf/cm$^2$ to make the layer uniform. Subsequently, aging was conducted for 48 hours in a vacuum oven controlled at 80° C. to fully eliminate volatiles (the water, solvent, etc.) so that a positive electrode plate was obtained.

(Negative Electrode Plate)

Using the slurry composition of Example 1 and employing, as a substrate, a copper-foil collector, the slurry composition was applied onto one side of the substrate by a comma roll coater. The thus-coated substrate was then dried for 2 minutes in an oven controlled at 110° C., and was further dried for 2 minutes in the oven controlled at 180° C. to eliminate the solvent and to have the polymer component crosslinked, so that a coating film layer was formed with a dry thickness of 1 μm on the collector.

Next, a negative electrode formulation with a negative-electrode active material contained therein was prepared in a manner to be described hereinafter. As materials for the negative electrode formulation, carbon powder obtained by thermally decomposing coal coke at 1,200° C., acetylene black as a conductive aid and the PVDF solution as a binder were stirred and mixed at a mixing ratio of 90 parts, 5 parts and 50 parts at a rotational speed of 60 rpm for 120 minutes in a planetary mixer to obtain a slurry-form, negative electrode formulation with the negative-electrode active material contained therein.

Using the negative electrode formulation obtained as described above, the negative electrode formulation was further applied onto the surface of the coating film layer by a comma roll coater. The thus-coated negative electrode collector was then dried for 2 minutes in an oven controlled at 110° C., and was further dried for 2 minutes in the oven controlled at 180° C. to eliminate the solvent, so that a negative-electrode composite layer with an active material layer formed with a dry thickness of 100 μm on the coating film layer was obtained. The negative-electrode composite layer obtained in the above-described manner was pressed under the condition of 5,000 kgf/cm$^2$ to make the layer uniform. Subsequently, aging was conducted for 48 hours in a vacuum oven controlled at 80° C. to fully eliminate volatiles (the water, solvent, etc.) so that a negative electrode plate was obtained.

(Cell)

An electrode unit was first formed by using the positive electrode plate and negative electrode plate, which had been obtained above, and rolling them into a volute form with a separator interposed therebetween. The separator was made of a porous polyolefin (polypropylene, polyethylene or a copolymer thereof) film having a width broader than the positive electrode plate and a three-dimensional porous (spongy) structure. The electrode unit was then inserted into a bottomed cylindrical, stainless steel can, which would also serve as a negative electrode terminal, so that a cell of the AA size and 500 mAh rated capacity was assembled. Charged as an electrolyte into the cell was a solution of 1 mole of $LiPF_6$ as a supporting salt in a mixed solvent prepared by combining EC (ethylene carbonate), PC (propylene carbonate) and DME (dimethoxyethane) at a volume ratio of 1:1:2 to give a total volume of 1 liter.

For the measurement of cell characteristics, charge-discharge characteristics were measured under a temperature condition of 25° C. by a charge-discharge measuring instrument as will be described below. Twenty (20) cells were respectively charged at a current value of 0.2 CA charging current, firstly in a charging direction until the cell voltage reached 4.1 V. After a break of 10 minutes, the cells were discharged at the same current until the cell voltage dropped to 2.75 V. Subsequent to a break of 10 minutes, charging and discharging were then repeated 100 cycles under the same conditions to measure charge-discharge characteristics. When the charge-discharge capacity in the cycle was assumed to be 100, the charge-discharge capacity in the 100$^{th}$ cycle (hereinafter referred to as "charge-discharge capacity retention" for the sake of brevity) was 98%.

Examples 21 to 25, Comparative Example 4

Positive Electrode Plates, Negative Electrode Plates, Cells

In a similar manner as in Example 20 except that the slurry compositions described in Table 3 were used in place of the slurry composition of Example 1 employed for the manufacture of the positive electrode plate and negative electrode plate used in Example 20, electrode plates were produced and cells were manufactured. The resultant cells were measured for charge-discharge characteristics in a similar manner as in Example 20. The results are shown in Table 3.

TABLE 3

Positive Electrode Plates, Negative Electrode Plates, and Cells

|  | Slurry composition employed for the production of positive electrode plate | Slurry composition employed for the production of negative electrode plate | Charge-discharge capacity retention |
|---|---|---|---|
| Ex. 20 | Slurry composition of Ex. 1 | Slurry composition of Ex. 1 | 98% |
| Ex. 21 | Slurry composition of Ex. 2 | Slurry composition of Ex. 2 | 99% |
| Ex. 22 | Slurry composition of Ex. 4 | Slurry composition of Ex. 4 | 98% |
| Ex. 23 | Slurry composition of Ex. 9 | Slurry composition of Ex. 9 | 97% |
| Ex. 24 | Slurry composition of Ex. 14 | Slurry composition of Ex. 14 | 96% |
| Ex. 25 | Slurry composition of Ex. 19 | Slurry composition of Ex. 19 | 98% |
| Comp. Ex. 4 | Slurry composition of Comp. Ex. 2 | Slurry composition of Comp. Ex. 2 | 81% |

Application to Capacitors

Example 26

Capacitor

Using the slurry composition of Example 1 and employing, as a substrate, a collector formed of a 20-μm thick aluminum foil, the slurry composition was applied onto one side of the substrate by a comma roll coater. After the coating, the coated substrate was dried for 2 minutes in an oven controlled at 110° C. The coated substrate was further dried for 2 minutes in the oven controlled at 180° C. to eliminate the solvent and to have the polymer component crosslinked, so that a coating film layer was formed with a dry thickness of 0.5 µm on the collector.

An electrode formulation with an active material contained therein was next prepared in a manner to be described hereinafter. As materials for the electrode formulation, high-purity activated carbon powder (specific surface area: 1,500 m$^2$/g, average particle size: 10 µm; 100 parts) and acetylene black (8 parts) as a conductive material were charged in a planetary mixer, and the PVDF solution was added to give a total solids concentration of 45%, followed by mixing for 60 minutes. Subsequently, the mixture was diluted with NMP to a solids concentration of 42%, followed by further mixing for 10 minutes to obtain an electrode formulation. Using a doctor blade, the electrode formulation was applied onto the coating film layer, followed by drying at 80° C. for 30 minutes in a fan dryer. Using a roll press, pressing was then conducted to obtain a polarizable, capacitor electrode plate having a thickness of 80 µm and a density of 0.6 g/cm$^3$.

From the polarizable, capacitor electrode plate produced as described above, two discs were cut out with a diameter of 15 mm. Those discs were dried at 200° C. for 20 hours. Those two electrode discs were arranged with their electrode layer sides opposing each other, and a cellulose-made, disc-shaped separator of 18 mm in diameter and 40 µm in thickness was held between the electrode discs. The thus-obtained electrode unit was placed in a coin-shaped case made of stainless steel (diameter: 20 mm, height: 1.8 mm, stainless steel thickness: 0.25 mm) and equipped with a polypropylene-made packing. An electrolyte was charged into the case such that no air was allowed to remain. A 0.2-mm thick stainless steel cap was put and fixed on the case with the polypropylene-made packing interposed therebetween. The case was then sealed to produce a coin-shaped capacitor of 20 mm in diameter and about 2 mm in thickness. As the electrolyte, a solution with tetraethylammonium tetra fluoroborate dissolved at a concentration of 1 mole/L in propylene carbonate was employed. The capacitor obtained as described above was measured for capacitance and internal resistance. The results are shown in Table 4.

Examples 27 to 30

Capacitors

In a similar manner as in Example 26 except that the slurry compositions described in Table 4 were used in place of the slurry composition of Example 1 employed in Example 26, electrode plates were produced and capacitors were manufactured, and the characteristics of the respective capacitors were evaluated. The results are shown in Table 4.

Comparative Example 5

In a similar manner as in Example 26 except that the slurry composition of Comparative Example 2 was used in place of the slurry composition of Example 1 employed in Example 26, electrode plates were produced and a capacitor was manufactured. Further, the internal resistance and capacitance of the capacitor were measured, and were used as references for evaluating the polarizable electrode plates and capacitors of the examples.

Concerning the internal resistances and capacitances in Table 4, they were measured as will be described next, and were evaluated in accordance with the below-described standards. With respect to each capacitor, its capacitance and internal resistance were measured at a current density of 20 mA/cm$^2$, and based on the capacitor of Comparative Example 5 as a reference, the performance of the capacitor of each example was evaluated in accordance with the following standards. The greater the capacitance and the lower the internal resistance, the better the performance as a capacitor.

(Evaluation Standards for Capacitance)

A: Capacitance greater by 20% or more than Comparative Example 5.

B: Capacitance greater by 10% or more but less than 20% than Comparative Example 5.

C: Capacitance equal to or smaller than Comparative Example 5.

(Evaluation Standards for Internal Resistance)

A: Internal resistance lower by 20% or more than Comparative Example 5.

B: Internal resistance lower by 10% or more but less than 20% than Comparative Example 5.

C: Internal resistance equal to or higher than Comparative Example 5.

TABLE 4

| | Characteristics of Capacitors | | |
|---|---|---|---|
| | Slurry composition employed for the production of polarizable electrode plate | Capacitance | Internal resistance |
| Ex. 26 | Slurry composition of Ex. 1 | B | B |
| Ex. 27 | Slurry composition of Ex. 3 | B | B |
| Ex. 28 | Slurry composition of Ex. 5 | B | B |
| Ex. 29 | Slurry composition of Ex. 11 | B | A |
| Ex. 30 | Slurry composition of Ex. 12 | B | A |
| Comp. Ex. 5 | Slurry composition of Comp. Ex. 2 | — | — |

As evident from the above examples and comparative example, a capacitor of large capacitance and low internal resistance can be obtained when electrode plates having coating films formed from the slurry composition according the present invention are produced, and the capacitor is manufactured using the electrode plates.

<Preparation of Various Polymer Solutions>

The compositions of the individual polymer solutions to be employed in examples, referential examples and comparative examples are shown in Table 5. The abbreviations of the components, which are shown in Table 5 and are other than that to be described below, are the same as in Table 1. Of the polar solvent used in the individual polymer solutions, dimethylsulfoxide is abbreviated as "DMSO".

<Sample 2-1>

Hydroxyethylcellulose ("HEC DAICEL SP400", product of Daicel Chemical Industries, Ltd.; 5 parts) was dispersed in NMP (92 parts). Subsequent to the addition of PTC (3 parts) to the dispersion, the resulting mixture was stirred at 50° C. for 2 hours to achieve dissolution, so that a solution of hydroxylethylcellulose (100 parts) was prepared.

<Samples 2-2 to 2-14>

The individual polymer solutions, which were to be employed in the examples, referential examples and comparative examples, were prepared in a similar manner as in Sample 2-1 except that the kind and content (weight) of the polymer, the kind and content of the polybasic acid or the like and the kind and content of the polar solvent were varied as shown in Table 5.

TABLE 5

Polymer Solutions

| Sample | Polymer Kind | parts | Polybasic acid Kind | parts | Polar solvent Kind | parts |
|---|---|---|---|---|---|---|
| 2-1 | Hydroxyethyl-cellulose | 5 | PTC | 3 | NMP | 92 |
| 2-2 | Carboxymethyl-cellulose | 4 | BTC | 4 | Water | 92 |
| 2-3 | Cationized cellulose | 3 | CHTC | 2 | NMP | 95 |
| 2-4 | Hydroxyethyl starch | 5 | Trimellitic acid | 4 | NMP | 91 |
| 2-5 | Carboxymethyl chitin | 4 | NTC | 3 | NMP | 93 |
| 2-6 | Hydroxyethyl chitosan | 5 | CHHC | 2 | DMSO | 93 |
| 2-7 | Glycerylated chitosan | 5 | Pyromellitic acid | 5 | NMP | 90 |
| 2-8 | Propylene glycol alginate | 3 | BTC | 5 | Water | 92 |
| 2-9 | Polyallylamine | 5 | BTC | 2 | Water | 93 |
| 2-10 | Polyvinylamine | 5 | BTC | 2 | Water | 93 |

<Preparation of Coating Formulations and Coating Films and Evaluation of Coating Films>

Referential Example 1

A coating formulation, which was employed in this referential example and was formed of a water-based slurry composition containing a hydrophobic filler, was prepared in a manner to be described hereinafter. Acetylene black as the hydrophobic filler and the polymer solution of Sample 2-1 in Table 5 were stirred and mixed at a mixing ratio of 5 parts to 95 parts at a rotational speed of 60 rpm for 120 minutes in a planetary mixer to obtain a slurry-form coating formulation.

Using the coating formulation obtained as described above and employing, as a substrate, a collector formed of a 20-μm thick aluminum foil, the slurry composition was applied onto one side of the substrate by a comma roll coater. After the coating the coated substrate was dried for 2 minutes in an oven controlled at 110° C., and was further dried for 2 minutes, in the oven controlled at 180° C. to eliminate the solvent and to have the polymer component crosslinked, so that a coating film was formed with a dry thickness of 1 μm on the collector.

Parallel lines, which consisted of perpendicularly-intersecting 11 vertical lines and 11 horizontal lines, were drawn by a cutter at intervals of 1 mm on the coating film layer obtained as described above so that 100 squares were formed within 1 cm$^2$. A mending tape was applied to the surface of the coating film layer, and tape peeling was then conducted. The number of squares which were not peeled off was determined as a measure of adhesiveness to the collector. The average of 10 tests was 99.0 squares. Further, the conditions of the coating film layer were observed after the coating film layer with the squares formed thereon as described above was immersed at 70° C. for 72 hours in a solution prepared by dissolving LiPF$_6$ (1 mole) as a supporting salt in a mixed solvent of EC (ethylene carbonate), PC (propylene carbonate) and DME (dimethoxyethane) combined together at a volume ratio of 1:1:2. One developed no changes is indicated as "none" under "solubility/swellability", while one with its coating film layer having been peeled or swollen is indicated as "equipped" under "solubility/swellability".

Also to evaluate the electrical conductivity of the coating film layer obtained as described above, the coating formulation was applied onto a glass plate by a comma roll coater, and the thus-coated glass plate was then dried for 1 minute in an oven controlled at 200° C. to form, a conductive coating film (dry thickness: 4 μm).

The surface resistivity of the resultant coating film was determined by the four-point probe method in accordance with JIS K 7194. The measurement was conducted under the conditions of 25° C. and 60% relative humidity by using the "LORESTA-GP MCP-T610" (manufactured by Mitsubishi Chemical Analytech Co., Ltd.).

Examples 31 to 34, Comparative Examples 6 and 7, and Referential Examples 2 to 6

Coating films were prepared in a similar manner as in Referential Example 1 except that the individual polymer solutions described in Table 6 were used in place of the polymer solution of Sample 2-1 employed in Referential Example 1. The adhesiveness, solubility/swellability and surface resistivity of the resulting coating films were then determined, and the results are shown in Table 6. It is to be noted that the PVDF solution was used in Comparative Example 6 and the styrene-butadiene copolymer latex (with the use of sodium carboxymethylcellulose as a thickener) was used in Comparative Example 7.

TABLE 6

Compositions and Physical Properties of Slurry Compositions

| | Polymer solution | Content* | Adhesiveness (av. value) | Solubility/ Swellability | Surface resistivity (Ω/□) |
|---|---|---|---|---|---|
| Ref. Ex. 1 | Sample 2-1 | 5 | 99 | None | 1,310 |
| Ref. Ex. 2 | Sample 2-3 | 5 | 92 | None | 1,280 |
| Ref. Ex. 3 | Sample 2-4 | 7 | 99 | None | 1,520 |
| Ref. Ex. 4 | Sample 2-5 | 4 | 95 | None | 1,150 |
| Ref. Ex. 5 | Sample 2-6 | 5 | 97 | None | 1,120 |
| Ref. Ex. 6 | Sample 2-7 | 5 | 100 | None | 970 |
| Ex. 31 | Sample 2-2 | 3 | 94 | None | 1.070 |
| Ex. 32 | Sample 2-8 | 5 | 91 | None | 1,440 |
| Ex. 33 | Sample 2-9 | 5 | 98 | None | 1,330 |
| Ex. 34 | Sample 2-10 | 5 | 97 | None | 1,380 |
| Comp. Ex. 6 | PVDF solution | 5 | 37 | Equipped | 1,800 |
| Comp. Ex. 7 | SBR + CMC dispersion | 3 | 95 | Equipped | 1,160 |

SBR: Styrene-butadiene copolymer latex ("NALSTAR SR-112", product of Nippon A & L Inc.)
CMC: Sodium carboxymethylcellulose ("SUNROSE F-600LC", product of Nippon Paper Chemicals Co., Ltd.)
*Content of resin per 100 parts of coating formulation (parts: solids content)

<Manufacture and Evaluation of Positive Electrode Plates, Negative Electrode Plates and Cells>

Referential Example 7

Positive Electrode Plate, Negative Electrode Plate, Cell (Positive Electrode Plate)

A positive electrode formulation with a positive-electrode active material contained therein was prepared in a manner to be described hereinafter. As materials for the positive electrode formulation, $LiCoO_2$ powder having particle sizes of from 1 to 100 μm, acetylene black as a conductive aid and the PVDF solution as a binder were used at a mixing ratio of 90 parts, 5 parts and 50 parts. They were then stirred and mixed at a rotational speed of 60 rpm for 120 minutes in a planetary mixer to obtain a slurry-form, positive electrode formulation with the positive-electrode active material contained therein.

Using the positive electrode formulation obtained as described above, the positive electrode formulation was applied by a comma roll coater onto the surface of the coating film layer obtained in Referential Example 1. The thus-coated positive electrode collector was then dried for 2 minutes in an oven controlled at 110° C., and was further dried for 2 minutes in the oven controlled at 180° C. to eliminate the solvent, so that a positive-electrode composite layer with an active material layer formed with a dry thickness of 100 μm on the coating film layer was obtained. The positive-electrode composite layer obtained in the above-described manner was pressed under the condition of 5,000 $kgf/cm^2$ to make the layer uniform. Subsequently, aging was conducted for 48 hours in a vacuum oven controlled at 80° C. to fully eliminate volatiles (the solvent, unreacted polybasic acid, etc.) so that a positive electrode plate was obtained.

(Negative Electrode Plate)

Using the coating formulation of Referential Example 1 and employing, as a substrate, a copper-foil collector, the coating formulation was applied onto one side of the substrate by a comma roll coater. The thus-coated substrate was then dried for 2 minutes in an oven controlled at 110° C., and was further dried for 2 minutes in the oven controlled at 180° C. to eliminate the solvent and to have the resin binder crosslinked, so that a coating film layer was formed with a dry thickness of 1 μm on the collector.

Next, a negative electrode formulation with a negative-electrode active material contained therein was prepared in a manner to be described hereinafter. As materials for the negative electrode formulation, carbon powder obtained by thermally decomposing coal coke at 1,200° C., acetylene black as a conductive aid and the PVDF solution as a binder were used at a mixing ratio of 90 parts, 5 parts and 50 parts. Described specifically, they were stirred and mixed at a rotational speed of 60 rpm for 120 minutes in a planetary mixer to obtain a slurry-form, negative electrode formulation with the negative-electrode active material contained therein.

Using the negative electrode formulation obtained as described above, the negative electrode formulation was applied onto the surface of the coating film layer by a comma roll coater. The thus-coated negative electrode collector was then dried for 2 minutes in an oven controlled at 110° C., and was further dried for 2 minutes in the oven controlled at 180° C. to eliminate the solvent, so that a negative-electrode composite layer with an active material layer formed with a dry thickness of 100 μm on the coating film layer was obtained. The negative-electrode composite layer obtained in the above-described manner was pressed under the condition of 5,000 $kgf/cm^2$ to make the layer uniform. Subsequently, aging was conducted for 48 hours in a vacuum oven controlled at 80° C. to fully eliminate volatiles (the solvent, unreacted polybasic acid, etc.) so that a negative electrode plate was obtained.

(Cell)

An electrode unit was first formed by using the positive electrode plate and negative electrode plate, which had been obtained above, and rolling them into a volute form with a separator interposed therebetween. The separator was made of a porous polyolefin (polypropylene, polyethylene or a copolymer thereof) film having a width broader than the positive electrode plate and a three-dimensional porous (spongy) structure. The electrode unit was then inserted into a bottomed cylindrical, stainless steel can, which would also serve as a negative electrode terminal, so that a cell of the AA size and 500 mAh rated capacity was assembled. Charged as an electrolyte into the cell was a solution of 1 mole of $LiPF_6$ as a supporting salt in a mixed solvent prepared by combining EC (ethylene carbonate), PC (propylene carbonate) and DME (dimethoxyethane) at a volume ratio of 1:1:2 to give a total volume of 1 liter.

For the measurement of cell characteristics, charge-discharge characteristics were measured under the temperature condition of 25° C. by a charge-discharge measuring instrument. Twenty (20) cells were respectively charged at a current value of 0.2 CA charging current, firstly in a charging di reaction until the cell voltage reached 4.1 V. After a break of 10 minutes, the cells were discharged at the same current until the cell voltage dropped to 2.75 V. Subsequent to a break of 10 minutes, charging and discharging were then repeated 100 cycles under the same conditions. When the charge-discharge capacity in the $1^{st}$ cycle was assumed to be 100, the charge-discharge capacity in the $100^{th}$ cycle (charge-discharge capacity retention) was 97%.

Examples 35 to 37, Referential Examples 8 to 9, Comparative Example 8

Positive Electrode Plates, Negative Electrode Plates, Cells

In a similar manner as in Referential Example 7 except that the slurry formulations and coating films described in Table 7 were used in place of the slurry formulation and coating film of Referential Example 1 employed for the production of the positive electrode plate and negative electrode plate used in Referential Example 7, electrode plates were produced and cells were manufactured. The resultant cells were measured for charge-discharge characteristics in a similar manner as in Referential Example 7. The results are shown in Table 7.

TABLE 7

Examples of Positive Electrode Plates, Negative Electrode Plates, and Cells

| | Coating film employed for the production of positive electrode plate | Coating formulation employed for the production of negative electrode plate | Charge-discharge capacity retention |
|---|---|---|---|
| Ref. Ex. 7 | Coating film of Ref. Ex. 1 | Coating formulation of Ref. Ex. 1 | 97% |
| Ref. Ex. 8 | Coating film of Ref. Ex. 4 | Coating formulation of Ref. Ex. 4 | 95% |
| Ref. Ex. 9 | Coating film of Ref. Ex. 6 | Coating formulation of Ref. Ex. 6 | 98% |

TABLE 7-continued

Examples of Positive Electrode Plates,
Negative Electrode Plates, and Cells

| | Coating film employed for the production of positive electrode plate | Coating formulation employed for the production of negative electrode plate | Charge-discharge capacity retention |
|---|---|---|---|
| Ex. 35 | Coating film of Ex. 32 | Coating formulation of Ex. 32 | 99% |
| Ex. 36 | Coating film of Ex. 33 | Coating formulation of Ex. 33 | 98% |
| Ex. 37 | Coating film of Ex. 34 | Coating formulation of Ex. 34 | 99% |
| Comp. Ex. 8 | Coating film of Comp. Ex. 6 | Coating formulation of Comp. Ex. 6 | 83% |

Application to Capacitors

Referential Example 10

Capacitor

Using the coating formulation of Referential Example 1 and employing, as a substrate, a collector formed of a 20-μm thick aluminum foil, the coating formulation was applied onto one side of the substrate by a comma roll coater. After the coating, the coated substrate was dried for 2 minutes in an oven controlled at 110° C. The coated substrate was further dried for 2 minutes in the oven controlled at 180° C. to eliminate the solvent and to have the resin binder crosslinked, so that a coating film layer was formed with a dry thickness of 0.5 μm on the collector.

An electrode formulation with an active material contained therein was next prepared in a manner to be described hereinafter. As materials for the electrode formulation, high-purity activated carbon powder (specific surface area: 1,500 m$^2$/g, average particle size: 10 μm; 100 parts) and acetylene black (8 parts) as a conductive material were charged in a planetary mixer, and the solution of polyvinylidene fluoride in NMP was added to give a total solids concentration of 45%, followed by mixing for 60 minutes. Subsequently, the mixture was diluted with NMP to a solids concentration of 42%, followed by further mixing for 10 minutes to obtain an electrode formulation. Using a doctor blade, the electrode formulation was applied onto the coating film layer, followed by drying at 80° C. for 30 minutes in a fan dryer. Using a roll press, pressing was then conducted to obtain a polarizable, capacitor electrode plate having a thickness of 80 μm and a density of 0.6 g/cm$^3$.

From the polarizable, capacitor electrode plate produced as described above, two discs were cut out with a diameter of 15 mm. Those discs were dried at 200° C. for 20 hours. Those two electrode discs were arranged with their electrode layer sides opposing each other, and a cellulose-made, disc-shaped separator of 18 mm in diameter and 40 μm in thickness was held between the electrode discs. The thus-obtained electrode unit was placed in a coin-shaped case made of stainless steel (diameter: 20 mm, height: 1.8 mm, stainless steel thickness: 0.25 mm) and equipped with a polypropylene-made packing. An electrolyte was charged into the case such that no air was allowed to remain. A 0.2-mm thick stainless steel cap was put and fixed on the case with the polypropylene-made packing interposed therebetween. The case was then sealed to produce a coin-shaped capacitor of 20 mm in diameter and about 2 mm in thickness. As the electrolyte, a solution with tetraethylammonium tetrafluoroborate dissolved at a concentration of 1 mole/L in propylene carbonate was employed. The capacitor obtained as described above was measured for capacitance and internal resistance. The results are shown in Table 8.

Examples 38 and 39, and Referential Examples 11 and 12

Capacitors

In a similar manner as in Referential Example 10 except that the coating formulations shown below in Table 8 were used in place of the coating formulation of Referential Example 1 employed in Referential Example 10, electrode plates were produced and capacitors were manufactured, and the characteristics of the respective capacitors were evaluated. The results are shown in Table 8.

Comparative Example 9

In a similar manner as in Referential Example 10 except that the coating formulation of Comparative Example 6 was used in place of the coating formulation of Referential Example 1 employed in Referential Example 10, electrode plates were produced and a capacitor was manufactured. The characteristics of the capacitor were used as references for evaluation. The results are shown in Table 8.

Concerning the internal resistances and capacitances in Table 8 to be described below, they were measured and evaluated as will be described next. With respect to each capacitor obtained, its capacitance and internal resistance were measured at a current density of 20 mA/cm$^2$, and based on Comparative Example 9 as a reference, were evaluated in accordance with the following evaluation standards. The greater the capacitance and the lower the internal resistance, the better the performance as a capacitor.

(Evaluation Standards for Capacitance)
  A: Capacitance greater by 20% or more than Comparative Example 9.
  B: Capacitance greater by 10% or more but less than 20% than Comparative Example 9.
  C: Capacitance equal to or smaller than Comparative Example 9.

(Evaluation Standards for Internal Resistance)
  A: Internal resistance lower by 20% or more than Comparative Example 9.
  B: Internal resistance lower by 10% or more but less than 20% than Comparative Example 9.
  C: Internal resistance equal to or higher than Comparative Example 9.

TABLE 8

Examples of Capacitors

| | Coating formulation employed for the production of polarizable electrode plate | Capacitance | Internal resistance |
|---|---|---|---|
| Ref. Ex. 10 | Coating formulation of Ref. Ex. 1 | B | B |
| Ref. Ex. 11 | Coating formulation of Ref. Ex. 4 | B | B |
| Ref. Ex. 12 | Coating formulation of Ref. Ex. 6 | A | A |
| Ex. 38 | Coating formulation of Ex. 33 | A | A |
| Ex. 39 | Coating formulation of Ex. 34 | A | A |
| Comp. Ex. 9 | Coating formulation of Comp. Ex. 6 | — | — |

As evident from the above examples and comparative example, a capacitor of large capacitance and low internal resistance can be obtained when electrode plates according to the present invention, each of which includes a coating film, are produced and the capacitor is manufactured using the electrode plates.

INDUSTRIAL APPLICABILITY

As has been described above, a useful, water-based slurry composition is provided according to the present invention. This water-based slurry composition can exhibit a binding function and dispersion function at the same time for a hydrophobic filler despite the use of a polysaccharide-based polymer or the like, which is low in environmental load, as a principal component. According to the present invention, another water-based slurry composition is also provided. Despite the inclusion of water in a dispersion medium, this water-based slurry composition remains at an adequate viscosity, is resistant to the occurrence of settling-out of a hydrophobic filler and retains a high degree of dispersion even when stored over a long period of time, and is economical. These water-based slurry compositions provided by the present invention make it possible to form coating films of excellent adhesiveness with the hydrophobic filler being uniformly dispersed therein, and are hence expected to find utility not only in cells but also in many fields such as electronic materials, paints, inks, toners, rubbers and plastics, ceramics, magnetic materials, adhesives, and liquid-crystal color filters, thereby providing a useful technology that can contribute to the protection of environment and the prevention of health hazards in many industrial fields. According to the present invention, a water-based slurry composition of a hydrophobic filler is also provided. This water-based slurry composition can be used as a coating formulation that enables the formation of a coating film equipped with excellent adhesiveness, solvent resistance and electrolyte resistance and also with improved contact resistance to a collector formed of an aluminum foil or copper foil, specifically at an interface between the collector and an electrode layer, so that the water-based slurry composition can be applied to electrode plates for electricity storage devices expected to find widespread utility, such as electrode plates for cells and polarizable electrode plates for capacitors, and also to the electricity storage devices including the electrode plates, and is extremely useful. According to the present invention, there is provided a technology that can contribute to the protection of environment and the prevention of health hazards, both of which have become objects of public concern, and can be used in many industrial fields.

The invention claimed is:

1. A water-based slurry composition comprising:
   (1) a water-based medium containing at least water as a polar solvent;
   (2) at least one polymer selected from the group consisting of cellulose derivatives, alginic acid derivatives, starch derivatives, chitin derivatives, chitosan derivatives, polyallylamine, and polyvinylamine;
   (3) a hydrophobic filler; and
   (4) a polybasic acid or a derivative thereof,
   wherein a content of water in the composition is 30 mass % or higher,
   the hydrophobic filler is dispersed uniformly in the composition, as indicated by a coating layer exhibiting no seeding, no streaks, and no irregularities when the composition is spread onto a glass plate, and
   the at least one polymer and the polybasic acid or the derivative thereof in the composition have not been subjected to a heat treatment as a combination.

2. The water-based slurry composition according to claim 1,
   wherein the polymer comprises at least one polymer selected from the group consisting of hydroxyethylcellulose, hydroxypropylcellulose, carboxymethylcellulose, cationized celluloses, hydroxyethyl starch, propylene glycol alginate, carboxymethyl chitin, polyallylamine, polyvinylamine, glycerylated chitosan, hydroxyethyl chitosan, hydroxypropyl chitosan, hydroxybutyl chitosan, and hydroxybutyl hydroxypropyl chitosan.

3. The water-based slurry composition according to claim 1,
   wherein the polybasic acid or the derivative thereof is at least one polybasic acid or at least one derivative thereof selected from the group consisting of 1,2,3,4-butanetetracarboxylic acid, pyromellitic acid, pyromellitic acid anhydride, trimellitic acid, trimellitic acid anhydride, adipic acid, citric acid, tartaric acid, 1,2,4-cyclohexanetricarboxylic acid, 1,2,3-propanetricarboxylic acid, 1,2,4,5-cyclohexanetetracarboxylic acid, 1,4,5,8-naphthalenetetracarboxylic acid, and 1,2,3,4,5,6-cyclohexanehexacarboxylic acid.

4. The water-based slurry composition according to claim 1,
   which has a viscosity at 25° C. in a range from 100 to 20,000 mPa·s when measured at a rotational speed of 30 rpm by a Brookfield rotational viscometer, and has a pH in a range of 6 or lower when measured at 25° C. after the slurry composition has been diluted with distilled water of same weight as weight of the slurry composition.

5. The water-based slurry composition according to claim 1,
   wherein the water-based medium comprises an organic solvent, and
   the organic solvent is soluble in water and is at least any one solvent selected from the group consisting of isopropyl alcohol, methyl alcohol, ethyl alcohol, t-butyl alcohol and N-methyl-2-pyrrolidone.

6. The water-based slurry composition according to claim 1,
   wherein the hydrophobic filler is at least one filler selected from the group consisting of a conductive carbon filler and/or silica.

7. The water-based slurry composition according to claim 1,
   wherein the hydrophobic filler is a conductive carbon filler, and
   the hydrophobic filler is capable of forming a coating film of an electrode plate for an electricity storage device.

8. An electrode plate for an electricity storage device, comprising a coating film placed between a collector and an electrode layer by applying the water-based slurry composition according to claim 7 between the collector and the electrode layer and heating the applied composition.

9. The electrode plate according to claim 8 for the electricity storage device, wherein the coating film has a thickness in a range from 0.1 to 2 μm.

10. The electrode plate according to claim 8 for the electricity storage device,
    wherein the coating film has a surface resistivity of 3,000Ω/□ or lower.

11. The electrode plate according to claim 8 for the electricity storage device, wherein the heat treatment is conducted at a temperature in a range from 100 to 250° C.

12. A positive electrode plate comprising the electrode plate according to claim 8 for the electricity storage device, wherein the collector is an aluminum foil, and
the electrode layer comprises a positive-electrode active material.

13. A negative electrode plate comprising the electrode plate according to claim 8 for the electricity storage device, wherein the collector is a copper foil, and
the electrode layer comprises a negative-electrode active material.

14. The electrode plate according to claim 8 for the electricity storage device,
wherein the collector is an aluminum foil, and
the electrode layer is a polarizable electrode.

15. An electricity storage device comprising the electrode plate according to claim 8.

16. The electricity storage device according to claim 15, which is a secondary cell or a capacitor.

17. A collector comprising a coating film formed on a surface of the collector by applying the water-based slurry composition according to claim 1 onto a surface of the collector and then subjecting the thus-applied slurry composition to a heat treatment.

18. The collector according to claim 17, further comprising an electrode layer formed on the coating film.

19. The water-based slurry composition according to claim 1,
wherein the composition is stable at room temperature for one month, without forming precipitation of the hydrophobic filler, or with precipitation that is dispersed by shaking the composition without using a dispersing device.

20. The water-based slurry composition according to claim 1,
wherein the composition further comprises at least one crosslinking agent other than the polybasic acid or the derivative thereof.

* * * * *